United States Patent
Farahmandi et al.

(10) Patent No.: US 6,449,139 B1
(45) Date of Patent: Sep. 10, 2002

(54) MULTI-ELECTRODE DOUBLE LAYER CAPACITOR HAVING HERMETIC ELECTROLYTE SEAL

(75) Inventors: C. Joseph Farahmandi, San Diego; John M. Dispennette, Oceanside; Edward Blank, San Diego; Robert W. Crawford, Menifee; Chenniah Nanjundiah, San Diego, all of CA (US)

(73) Assignee: Maxwell Electronic Components Group, Inc., San Diego, CA (US)

( * ) Notice: Subject to any disclaimer, the term of this patent is extended or adjusted under 35 U.S.C. 154(b) by 0 days.

(21) Appl. No.: 09/377,328

(22) Filed: Aug. 18, 1999

(51) Int. Cl.$^7$ .................. H01G 9/00; H01G 2/02; H01G 9/06

(52) U.S. Cl. ............. 361/502; 361/503; 361/518; 29/25.03

(58) Field of Search ................ 361/502, 503, 361/504, 505, 506, 507, 516–518; 27/25.03

(56) References Cited

U.S. PATENT DOCUMENTS

| | | | |
|---|---|---|---|
| 2,800,616 A | 7/1957 | Becker et al. | 317/230 |
| 3,105,178 A | 9/1963 | Meyers | 317/262 |

(List continued on next page.)

FOREIGN PATENT DOCUMENTS

| | | |
|---|---|---|
| EP | 0112923 | 6/1983 |
| EP | 0134706 | 8/1984 |

(List continued on next page.)

OTHER PUBLICATIONS

Cheng, et al.; "Preparation of Carbon Fibre Reinforced Aluminum Via Ultrasonic Liquid Infiltration Technique", *Materials Science and Technology*, 9, pp. 609–614 (Jul. 1993).

(List continued on next page.)

*Primary Examiner*—Dean A. Reichard
*Assistant Examiner*—Eric W. Thomas
(74) *Attorney, Agent, or Firm*—Fitch, Even, Tabin & Flannery

(57) ABSTRACT

A long life double layer capacitor and method of making the same including a case and a first terminal with an electrically insulating hermitic seal interposed between the first terminal and the case. A first current collector foil is electrically coupled to an interior portion of the first terminal and a first metal impregnated carbon cloth electrode having a metal impregnated side which is juxtaposed against the first current collector foil. A porous separator is then juxtaposed against the first metal impregnated carbon cloth electrode and separating the first metal impregnated carbon cloth electrode from a second metal impregnated carbon cloth electrode having a metal impregnated side which faces away from the porous separator. A second current collector foil is juxtaposed against the metal impregnated side of the second metal impregnated carbon cloth electrode and is electrically coupled to the second terminal. And an electrolyte solution saturates the first and second metal impregnated carbon cloth electrodes and is substantially contained by the case and the electrically insulating hermitic seal such that an influx of impurities into the electrolyte solution is substantially inhibited by the case and the electrically insulating hermitic seal.

65 Claims, 10 Drawing Sheets

U.S. PATENT DOCUMENTS

| | | | |
|---|---|---|---|
| 3,536,963 A | 10/1970 | Boos | 317/230 |
| 3,648,126 A | 3/1972 | Boos et al. | 317/230 |
| 3,652,902 A | 3/1972 | Hart et al. | 317/230 |
| 3,700,975 A | 10/1972 | Butherus et al. | 317/230 |
| 4,313,084 A | 1/1982 | Hosokawa et al. | 323/370 |
| 4,438,481 A | 3/1984 | Phillips et al. | 361/433 |
| 4,562,511 A | 12/1985 | Nishino et al. | 361/324 |
| 4,597,028 A | 6/1986 | Yoshida et al. | 361/305 |
| 4,622,611 A | 11/1986 | Bennett et al. | 361/433 |
| 4,683,516 A | 7/1987 | Miller | 361/328 |
| 4,709,303 A | 11/1987 | Fujiwara et al. | 361/433 |
| 4,724,927 A | 2/1988 | Morimoto et al. | 361/433 |
| 4,725,926 A | 2/1988 | Morimoto et al. | 361/433 |
| 4,725,927 A | 2/1988 | Morimoto et al. | 361/433 |
| 4,987,518 A * | 1/1991 | Dain | 361/517 |
| 5,065,286 A | 11/1991 | Kurabayashi et al. | 361/502 |
| 5,072,335 A | 12/1991 | Kurabayashi et al. | 361/502 |
| 5,072,336 A | 12/1991 | Kurabayashi et al. | 361/502 |
| 5,072,337 A | 12/1991 | Kurabayashi et al. | 361/502 |
| 5,080,963 A | 1/1992 | Tatarchuk et al. | 428/225 |
| 5,086,373 A | 2/1992 | Kurabayashi et al. | 361/502 |
| 5,096,663 A | 3/1992 | Tatarchuk | 419/11 |
| 5,099,398 A | 3/1992 | Kirabayashi et al. | 361/502 |
| 5,102,745 A | 4/1992 | Tatarchuk et al. | 428/605 |
| 5,121,301 A | 6/1992 | Kurabayashi et al. | 361/502 |
| 5,136,472 A | 8/1992 | Tsuchiya et al. | 361/502 |
| 5,142,451 A | 8/1992 | Kurabayashi et al. | 361/502 |
| 5,150,283 A | 9/1992 | Yoshida et al. | 361/502 |
| 5,304,330 A | 4/1994 | Tatarchuk et al. | 264/61 |
| 5,450,279 A | 9/1995 | Yoshida et al. | 361/502 |
| 5,621,607 A | 4/1997 | Farahmandi et al. | 361/502 |
| 5,777,428 A | 7/1998 | Farahmandi et al. | 313/352 |
| 5,862,035 A | 1/1999 | Farahmandi et al. | 361/502 |
| 5,907,472 A | 5/1999 | Farahmandi et al. | 361/502 |
| 6,212,061 B1 * | 4/2001 | Irwin et al. | 361/502 |

FOREIGN PATENT DOCUMENTS

| | | |
|---|---|---|
| EP | 0207167 | 12/1985 |
| EP | 0680061 | 3/1995 |
| JP | 5599714 | 7/1980 |
| JP | 594114 | 1/1984 |
| JP | 59105312 | 6/1984 |
| JP | 63261817 | 10/1988 |
| JP | 64001220 | 1/1989 |
| JP | 64001222 | 1/1989 |
| JP | 153524 | 3/1989 |
| JP | 1201908 | 8/1989 |
| JP | 1298712 | 12/1989 |
| JP | 266917 | 3/1990 |
| JP | 2177525 | 7/1990 |
| JP | 2248025 | 10/1990 |
| JP | 256805 | 12/1990 |
| JP | 2297915 | 12/1990 |
| JP | 3038815 | 2/1991 |
| JP | 3141629 | 6/1991 |
| JP | 465814 | 3/1992 |
| JP | 4206914 | 7/1992 |
| JP | 4206916 | 7/1992 |
| JP | 5299295 | 11/1993 |
| JP | 6275469 | 6/1994 |

OTHER PUBLICATIONS

Foster, et al.; "New Highly Conductive Inorganic Electrolytes", *J. Electrochem. Soc.*, pp. 2682–2686, (Nov. 1988).

Farahmandi, et al.; "Optimization of Carbon Fibers Used in Electrochemical Capacitors for Electric Vehicle Applications", *The 36th Power Sources Conference, Cherry Hill, New Jersey*, pp. 23–26 (Jun. 6–9, 1994).

Farahmandi, et al.; "Bipolar Electrochemical Capacitors Based on Organic Electrolytes for Electric Vehicle Applications", *The Fourth International Seminar on Double Layer Capacitors and Similar Engery Storage Devices, Boca Raton, Florida*, (Dec. 12–14, 1994).

Farahamndi, et al.; "A Comparison of Electrochemical Capacitors Using Organic and Aqueous Electrolytic Solutions for Electric Vehicle Applications", *Third International Seminar on Double Layer Capacitors and Similar Energy Storage Devices, Deerfield Beach, Florida*, (Dec. 6–8, 1993).

Fujii; "KYNOL Novoloid Fibers", *Informational Brochure*, (1990).

*Technical Notes*, "The Charcoal Cloth", (1987).

* cited by examiner

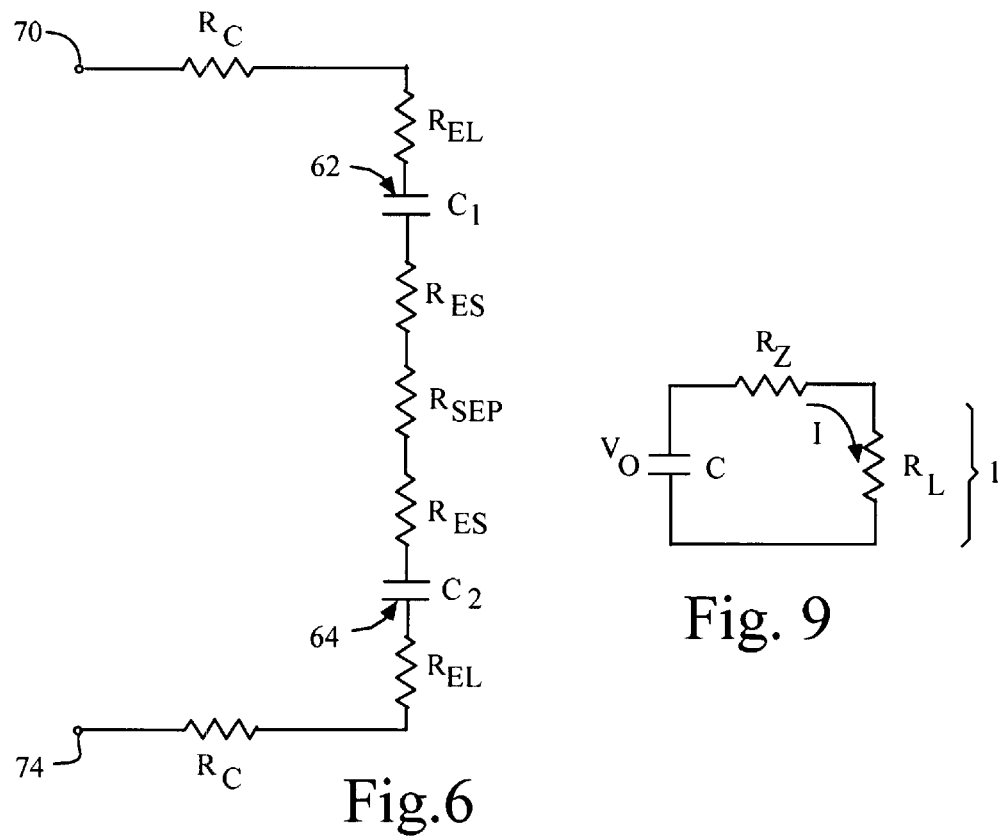
Fig.6
Fig. 9
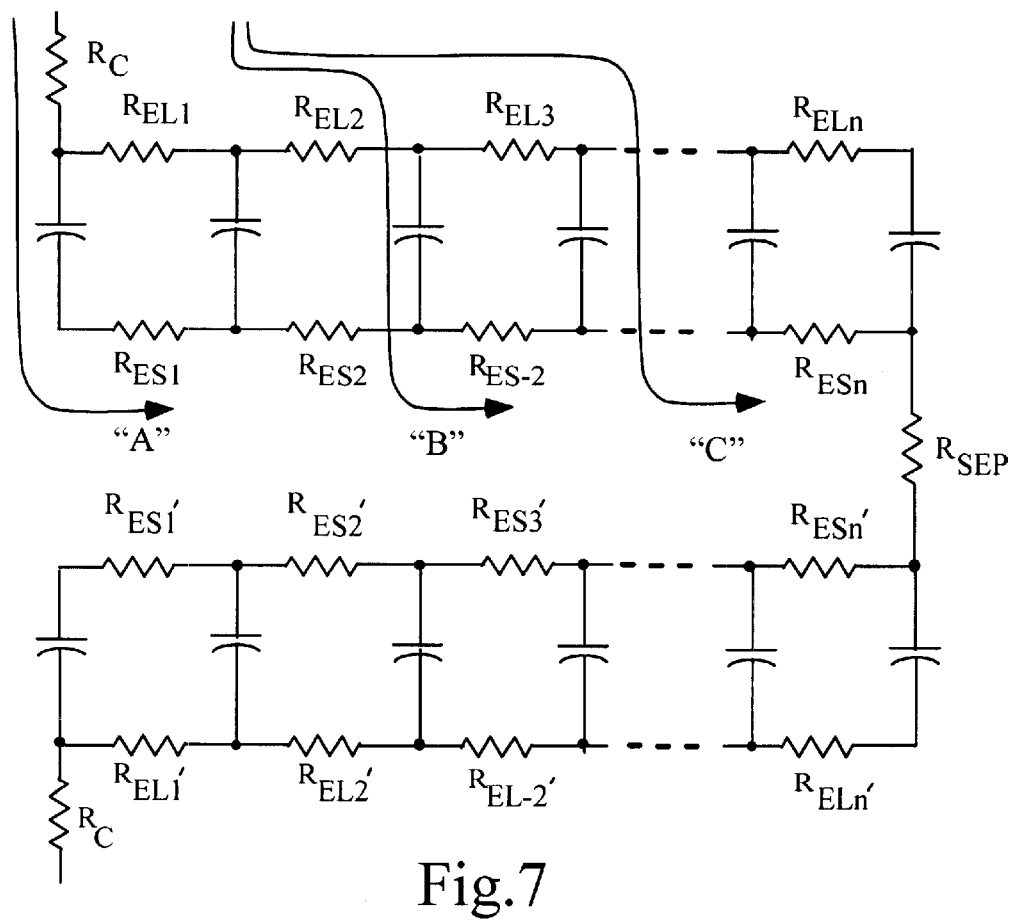
Fig.7

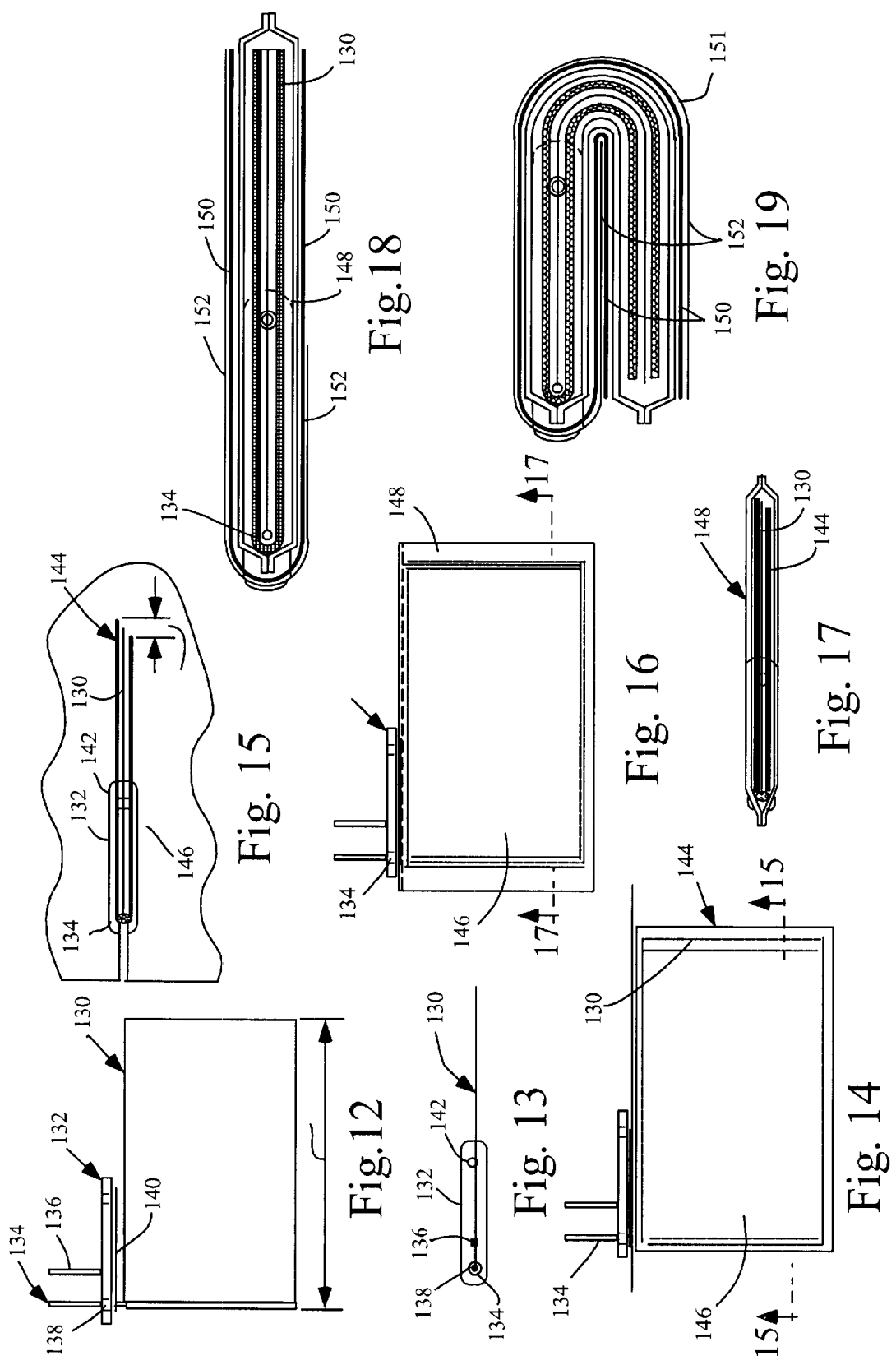

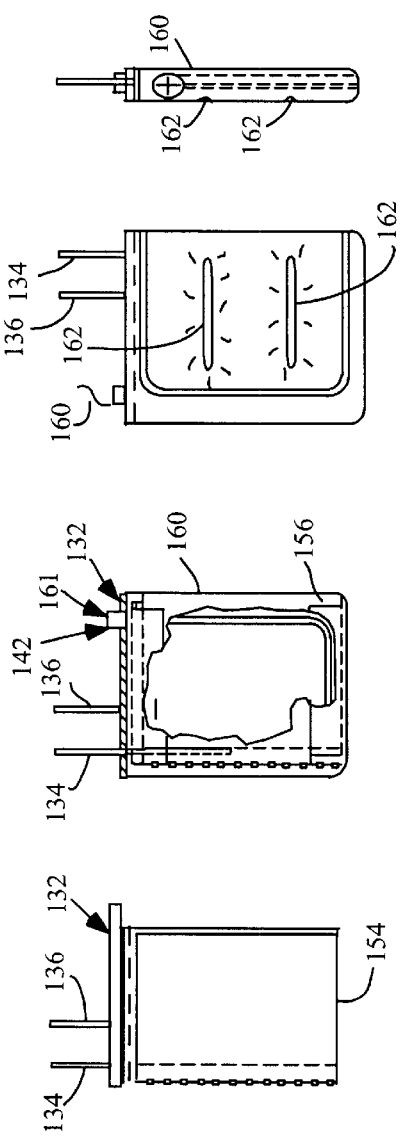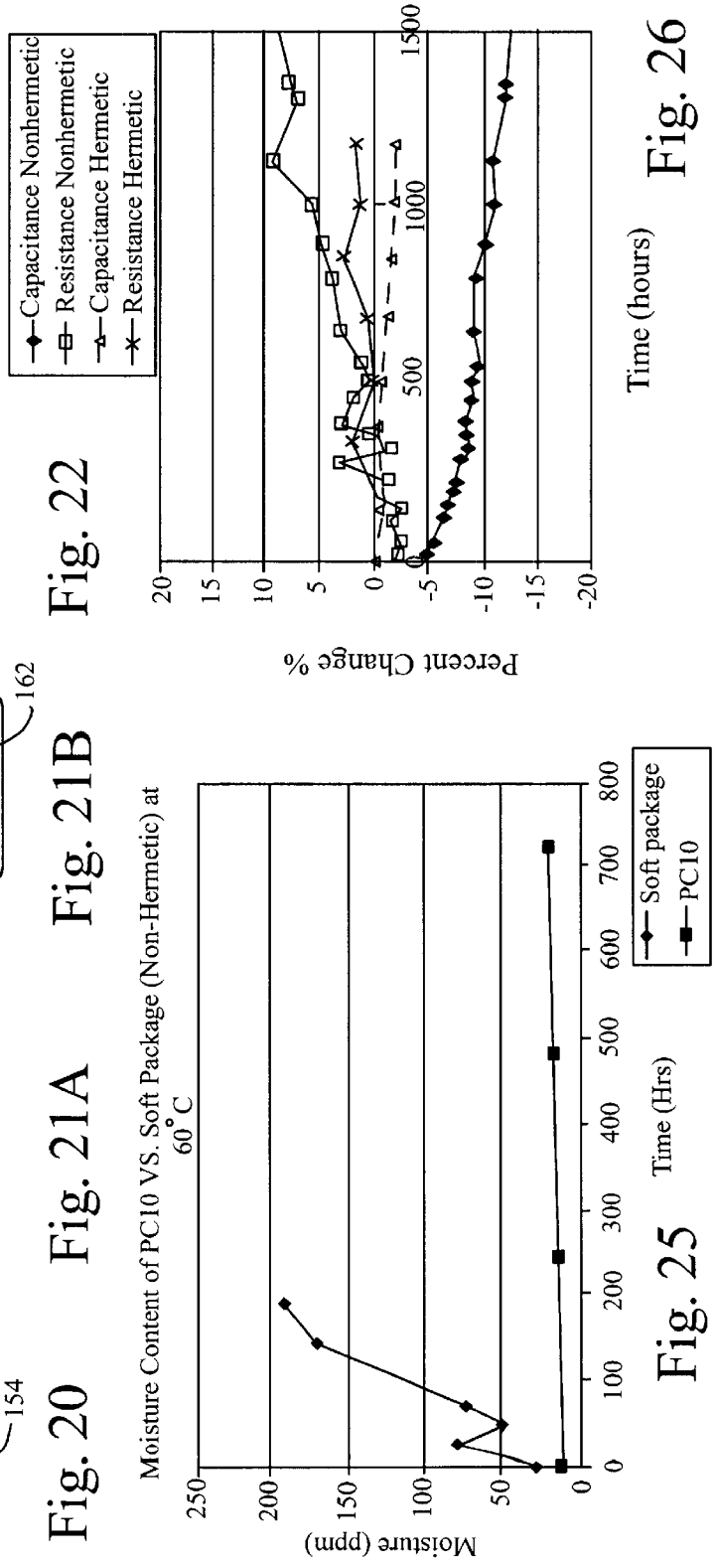

MULTI-ELECTRODE DOUBLE LAYER CAPACITOR HAVING HERMETIC ELECTROLYTE SEAL

BACKGROUND OF THE INVENTION

The present invention relates generally to an electric double layer capacitor, and more particularly to a high performance, high reliability double layer capacitor made with low-resistance aluminum-impregnated carbon-cloth electrodes and a high performance electrolytic solution. Even more particularly, the present invention relates to high performance, high reliability, long life, organic double layer capacitor made with low-resistance aluminum-impregnated carbon-cloth electrodes and a high performance electrolytic solution, and housed within a hermetically sealed case including a hermetically sealed, electrically insulated electrical feedthrough.

There is a well recognized need in the electronics industry for a rechargeable energy source with high reliability that can provide high power, that can be charged, discharged, and recharged quickly, and that has a high life cycle, i.e., is long life. Among applications that could benefit from such as device are industrial applications, consumer applications, and automotive applications.

Double layer capacitors, also referred to as electrochemical capacitors, are energy storage devices that are able to store more energy per unit weight and unit volume than traditional capacitors. In addition, they can typically deliver the stored energy at a higher power rating than rechargeable batteries.

Double layer capacitors consist of two porous electrodes that are isolated from electrical contact by a porous separator. Both the separator and the electrodes are impregnated with an electrolyte solution. This structure allows ionic current to flow between the electrodes through the porous separator at the same time that the porous separator prevents an electrical or electronic current (as opposed to ionic current) from shorting the two porous electrodes. Coupled to the back of each of the active electrodes is a current collecting plate. One purpose of the current collecting plate is to reduce ohmic losses in the double layer capacitor. If these current collecting plates are non-porous, they can also be used as part of the capacitor seal.

Double layer capacitors store electrostatic energy in a polarized liquid layer which forms when a potential exists between two electrodes immersed in an electrolyte. When the potential is applied across the electrodes, a double layer of positive and negative charges is formed at the electrode-electrolyte interface (hence, the name "double layer" capacitor) by the polarization of the electrolyte ions due to charge., separation under the applied electric field, and also due to the dipole orientation and alignment of electrolyte molecules over the entire surface of the electrodes.

The use of carbon electrodes in electrochemical capacitors with high power and energy density represents a significant advantage in this technology because carbon has a low density and carbon electrodes can be fabricated with very high surface areas. Fabrication of double layer capacitors with carbon electrodes has been known in the art for quite some time, as evidenced by U.S. Pat. No. 2,800,616 (Becker), and U.S. Pat. No. 3,648,126 (Boos et al.).

A major problem in many carbon electrode capacitors, including double layer capacitors, is that the performance of the capacitor is often limited because of the high internal resistance of the carbon electrodes. This high internal resistance may be due to several factors, including the high contact resistance of the internal carbon-carbon contacts, and the contact resistance of the electrodes with a current collector. This high resistance translates to large ohmic losses in the capacitor during the charging and discharge phases, which losses further adversely affect the characteristic RC (resistance×capacitance) time constant of the capacitor and interfere with its ability to be efficiently charged and/or discharged in a short period of time. There is thus a need in the art for lowering the internal resistance, and hence the time constant, of double layer capacitors.

Various electrode fabrication techniques have been disclosed over recent years. For example, the Yoshida et al. patent (U.S. Pat. No. 5,150,283) discloses a method of connecting a carbon electrode to a current collector by depositing carbon powder and other electrical conductivity-improving agents on an aluminum substrate.

Another related approach for reducing the internal resistance of carbon electrodes is disclosed in U.S. Pat. No. 4,597,028 (Yoshida et al.) which teaches that the incorporation of metals such as aluminum into carbon fiber electrodes can be accomplished through weaving metallic fibers into carbon fiber preforms.

Yet another approach for reducing the resistance of a carbon electrode is taught in U.S. Pat. No. 4,562,511 (Nishino et al.) wherein the carbon fiber is dipped into an aqueous solution to form a layer of a conductive metal oxide, and preferably a transition metal oxide, in the pores of the carbon fibers. Nishino et al. also discloses the formation of metal oxides, such as tin oxide or indium oxide by vapor deposition.

Still another related approach for achieving low resistance is disclosed in U.S. Pat. Nos. 5,102,745, 5,304,330, and 5,080,963 (Tatarchuk et al.). The Tatarchuk et al. patents demonstrate that metal fibers can be intermixed with a carbon preform and sintered to create a structurally stable conductive matrix which may be used as an electrode. The Tatarchuk et al. patents also teach a process that reduces the electrical resistance in the electrode by reducing the number of carbon-carbon contacts through which current must flow to reach the metal conductor. This approach works well if stainless steel or nickel fibers are used as the metal. However, applicants have learned that this approach has not been successful when aluminum fibers are used because of the formation of aluminum carbide during the sintering or heating of the electrode.

Another area of concern in the fabrication of double layer capacitors relates to the method of connecting the current collector plate to the electrode. This is important because the interface between the electrode and the current collector plate is another source of internal resistance of the double layer capacitor, and such internal resistance must be kept as low as possible.

U.S. Pat. No. 4,562,511 (Nishino et al.) suggests plasma spraying of molten metals such as aluminum onto one side of a polarizable electrode to form a current collector layer on the surface of the electrode. Alternative techniques for bonding and/or forming the current collector are also considered in the '511 Nishino et al. patent, including arc-spraying, vacuum deposition, sputtering, non-electrolytic plating, and use of conductive paints.

The previously-cited Tatarchuk et al. patents (U.S. Pat. Nos. 5,102,745, 5,304,330, and 5,080,963) show the bonding of a metal foil current collector to the electrode by sinter bonding the metal foil to the electrode element.

U.S. Pat. No. 5,142,451 (Kurabayashi et al.) discloses a method of bonding the current collector to the surface of the electrode by a hot curing process which causes the material of the current collectors to enter the pores of the electrode elements.

Still other related art concerned with the method of fabricating and adhering current collector plates can be found in U.S. Pat. Nos. 5,065,286; 5,072,335; 5,072,336; 5,072,337; and 5,121,301 all issued to Kurabayashi et al.

Recently, electrochemical capacitors employing non-aqueous (organic) electrolyte solutions have been developed. These double layer capacitors have the advantage of higher operating voltage, but generally suffer from higher internal resistance. Nonetheless, the operating voltage greatly increases the energy density of the double layer capacitor. For example, an aqueous double layer capacitor may only operate at 0.67 volts per cell, while a similar non-aqueous device will operate at 2.3 volts per cell. This difference in operating voltage increases energy density by a factor of 11.8.

Unfortunately, non-aqueous electrolytes tend to be much more sensitive to impurities, such as water or oxygen, in the electrolyte. Any level of these impurities will lead to gas generation within the double layer capacitor when the double layer capacitor is operated at high voltage. Because of this, manufacturers of non-aqueous electrolyte double layer capacitors take great care is limiting the levels of water and oxygen contamination within the electrolyte solution during manufacture, striving to achieve levels of contamination on the order of 10 to 100 parts per million.

In order to achieve long life in a double layer capacitor employing a non-aqueous electrolyte and that is operated at high voltage, care must be taken in limiting the influx of water and oxygen into the electrolyte solution. Commercially available non-aqueous electrolyte double layer capacitors are packaged with sealing technologies that limit the life of these double layer capacitors due to the influx of water and oxygen.

Another issue that continues to face virtually any technology that involves electronics is that of miniturization. With smaller and smaller devices being designed, and thus smaller and smaller components being demanded, pressures have been put on the makers of double layer capacitors to decrease device size, while maintaining a high level of capacitance. This demands not only extremely low internal resistances, but poses an additional problem.

This additional problem lies in the fact that, at least in non-aqueous electrolyte double-layer capacitors, environmental contamination from, for example, air and water leaking into the electrolyte result in a significant reduction in capacitance, and a corresponding increase in resistance, namely resistance to ionic current flow.

While in conventional double-layer capacitor devices conventional technology has been applied to seal the capacitors so as to both contain the electrolyte and to prevent contamination of the electrolyte with oxygen and water, as devices become increasingly miniaturized, conventional techniques are no longer suitable. Further complicating this problem is the fact that materials used in sealing the double-layer capacitor must be thermally and chemically compatible with the electrolyte and the case of the capacitor, and provide appropriate electrical characteristics, i.e., be conductive or an insulator, depending on where the seal is positioned.

With small double-layer capacitor devices, a further complication arises in that consumer demand is for devices that can be directly soldered to printed circuit boards. Thus external terminals must not only be compatible with the sealing approach adopted (and it with them), but must be of a material that is solderable using conventional soldering techniques and materials. Furthermore, in a conventional automated soldering process, the case and internal components of the double layer capacitor must be able to withstand exposure to high temperatures, for example, temperatures of up to 250 degrees Celsius for up to 5 minutes.

It is thus apparent that there is a continuing need for improved double layer capacitors. Such improved double layer capacitors need to deliver large amounts of useful energy at a very high power output and energy density ratings within a relatively short period of time, and need to be produced in a small, solderable, long-life device. Such improved double layer capacitors should also have a relatively low internal resistance and yet be capable of yielding a relatively high operating voltage. It is also apparent that these devices should be of low internal resistance.

SUMMARY OF THE INVENTION

The present invention addresses the above and other needs by providing a high performance, hermetically-sealed, double layer capacitor having multiple electrodes.

In one embodiment, the invention can be characterized as a long life double layer capacitor and method of making the same comprising a case and a first terminal with an electrically insulating hermitic seal interposed between the first terminal and the case. A first current collector foil is electrically coupled to an interior portion of the first terminal and a first metal impregnated carbon cloth electrode having a metal impregnated side. The metal impregnated side of the first metal impregnated carbon cloth electrode is juxtaposed against the, first current collector foil. A porous separator is then juxtaposed against the first metal impregnated carbon cloth electrode. A second metal impregnated carbon cloth electrode having a metal impregnated side is juxtaposed against the porous separator such that the porous separator is interposed between the first metal impregnated carbon cloth electrode and the second metal impregnated carbon cloth electrode. The second metal impregnated carbon cloth electrode is positioned such that an opposing side of the second metal impregnated carbon cloth electrode is opposite the metal impregnated side of the second metal impregnated carbon cloth electrode and the opposing side of the second metal impregnated carbon cloth electrode is juxtaposed against the porous separator. A second current collector foil is juxtaposed against the metal impregnated side of the second metal impregnated carbon cloth electrode. A second terminal is electrically coupled to the second current collector foil. And an electrolyte solution saturates the first metal impregnated carbon cloth electrode and the second metal impregnated carbon cloth electrode. The electrolyte solution is substantially contained by the case and the electrically insulating hermitic seal such that an influx of impurities into the electrolyte solution is substantially inhibited by the case and the electrically insulating hermetic seal.

In another embodiment, the invention can be characterized as a long life double layer capacitor and method of making the same comprising a hermetically sealed case containing a plurality of metal impregnated electrodes, each of the plurality of metal impregnated electrodes having a metal impregnated side. Also contained within the hermetically sealed case are a plurality of current collector foils each of which is juxtaposed against a respective one of the plurality of metal impregnated electrodes against said metal impregnated side. A porous separator material is positioned between respective ones of the plurality of metal impregnated electrodes and a non-aqueous electrolyte solution saturating said plurality of metal impregnated electrodes. Thus, a multi-electrode, single cell device is formed.

BRIEF DESCRIPTION OF DRAWINGS

The above and other aspects, features, and advantages of the present invention will be more apparent from the following more particular description thereof, presented in conjunction with the following drawings and Appendix, wherein:

FIG. 6 shows an equivalent circuit diagram of the basic double layer capacitor of FIG. 1;

FIG. 7 shows a more detailed representation of the equivalent circuit diagram of FIG. 6, particularly illustrating a relationship between electrode resistance and electrolyte solution resistance;

FIG. 9 is a simplified electrical equivalent circuit illustrating the role of internal resistance in the capacitor of FIG. 1;

FIG. 12 is a side view of a current collector foil of one embodiment coupled to a terminal that is hermetically sealed to a header plate using a glass-to-metal (hermetic) seal, such as may be employed in a particular embodiment of the capacitor of FIG. 1;

FIG. 13 is a top view of the current collector foil terminal glass-to-metal (hermetic) seal and header plate of FIG. 11;

FIG. 14 is a side view of the current collector foil of FIG. 11 (shown in dashed lines) with an aluminum impregnated carbon cloth electrode folded over the current collector foil so as to place an "aluminum side" of the aluminum impregnated carbon cloth electrode in electrical contact with the current collector foil, and, in turn, the terminal that is hermetically sealed to the header;

FIG. 15 is a top view of the current collector foil, aluminum impregnated carbon cloth electrode, terminal, hermetic seal and header plate of FIG. 14;

FIG. 16 is a side view of the current collector foil and aluminum impregnated carbon cloth electrode (both shown in dashed lines) of FIG. 14, with a porous separator enveloping the current collector foil and aluminum impregnated carbon cloth electrode so as to provide an electrically insulating barrier surrounding the aluminum impregnated electrode;

FIG. 17 is a top view of the current collector foil, aluminum impregnated carbon cloth electrode, porous separator, terminal, hermetic seal and header plate of FIG. 16;

FIG. 18 is a top cross-sectional view of the current collector foil, and aluminum impregnated carbon cloth electrode porous separator of FIG. 16, with a second aluminum impregnated carbon cloth electrode folded over both sides of the porous separator, and a second current collector folded fully over one side and half way over another side of the second aluminum impregnated carbon cloth electrode;

FIG. 19 is a top cross-sectional view of the current collector foil, aluminum impregnated carbon cloth electrode, porous separator, second aluminum impregnated carbon cloth electrode, and second current collector foil of FIG. 18 folded over toward the other side, i.e., the "one-half side", of the second current collector foil;

FIG. 20 is a side view of the current collector foil, aluminum impregnated carbon cloth electrode, porous separator, second aluminum impregnated carbon cloth electrode, and second current collector foil having been folded over as in FIG. 19;

FIG. 21A is a side view of the current collector foil, aluminum impregnated carbon cloth electrode, porous separator, second aluminum impregnated carbon cloth electrode, and second current collector foil having been folded over as in FIG. 19 and further having been inserted into a case (or can), with the header being welded to the case and fill hole in the header having been sealed with a welded ball bearing after contents of the case are dried and an electrolyte solution is added to the case through the fill hole;

FIG. 21B is a side view of the opposite side of the capacitor assembly shown in FIG. 21A having crimps indented into the case.

FIG. 22 is an end view of the case of FIGS. 21A and 21B having been sealed with the header and the ball bearing and also showing the crimps;

FIG. 25 is a graph showing moisture content on an ordinate axis versus time on an abscissa axis for the embodiment of FIGS. 11 through 22 (hermetically sealed double layer capacitor) in comparison to a non-hermetically sealed double layer capacitor having similar dimensions; and FIG. 26 is a set of graphs showing percentage change on an ordinate axis versus time on an abscissa axis for capacitance and for internal resistance of a non-hermetically sealed double layer capacitor, and for capacitance and for internal resistance of a hermetically sealed double layer capacitor such as the embodiment of FIGS. 11 through 21.

Corresponding reference characters indicate corresponding components throughout the several views of the drawings.

DETAILED DESCRIPTION OF THE INVENTION

The following description of the presently contemplated best mode, of practicing the invention is not to be taken in a limiting sense, but is made merely for the purpose of describing the general principles of the invention. The scope of the invention should be determined with reference to the claims.

Figure 1:
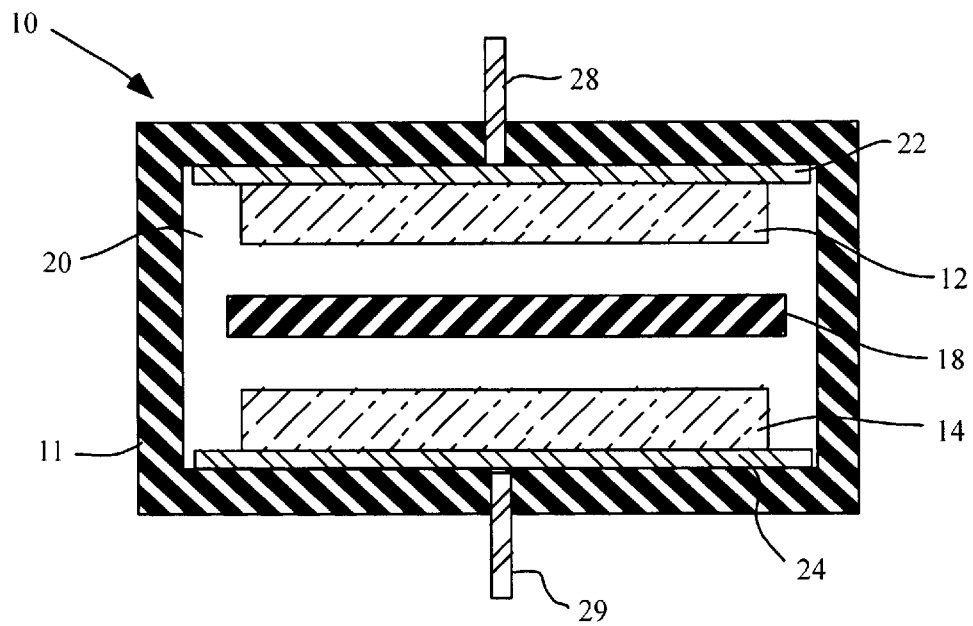
FIG. 1 is a sectional view of a single cell high performance double layer capacitor made in accordance with one embodiment of the present invention.

Referring to FIG. 1, a single cell, high performance double layer capacitor 10 is illustrated including a cell case 11, a pair of aluminum impregnated carbon cloth electrodes 12, 14, a porous separator 18, an electrolyte 20, a pair of current collector plates 22 and 24, and electrical leads 28, 29, (or terminals) extending from the current collector plates 22, 24 through the case 11, so as to provide an external electrical connection between an energy source and/or circuit and the aluminum impregnated carbon cloth electrodes 12, 14.

Figure 10:
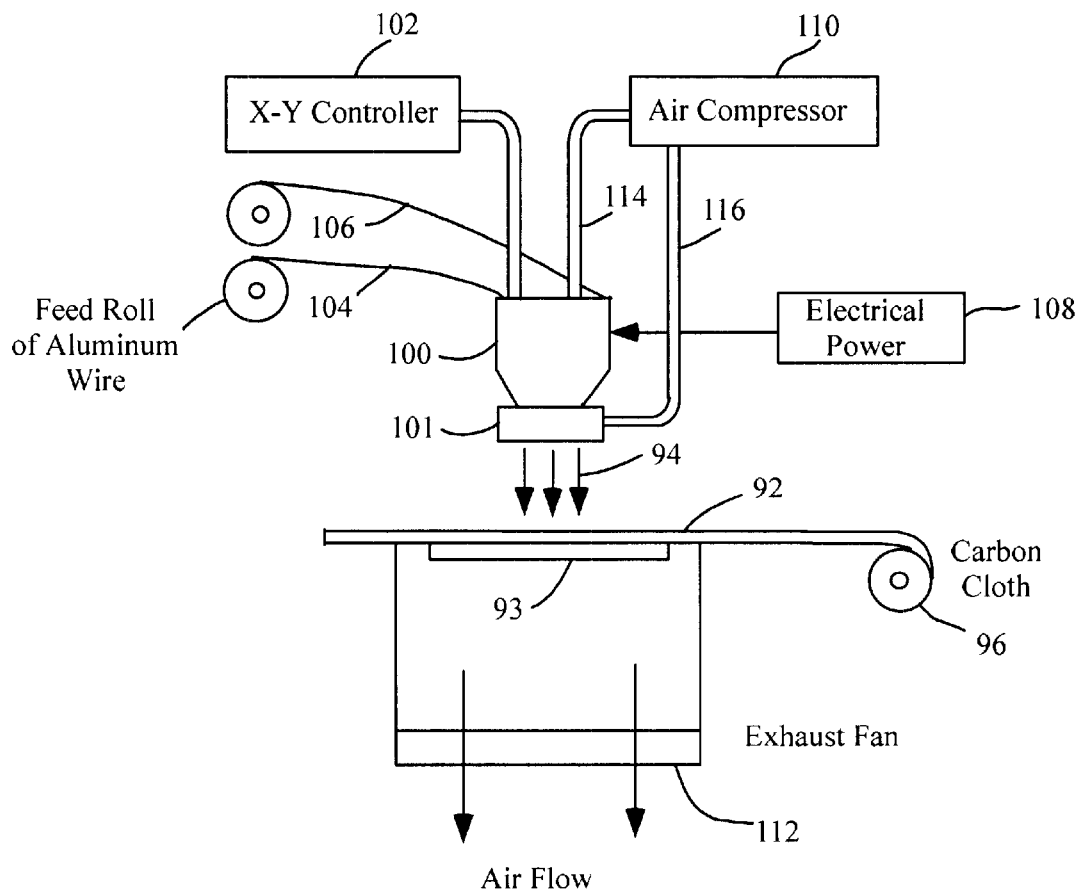
FIGS. 10 and 11 schematically show one system and technique for spraying a carbon fiber cloth with aluminum, thereby impregnating aluminum deep into the tow of the carbon fiber bundles of the cloth, as illustrated in FIGS. 4 and 5.
Figure 11:
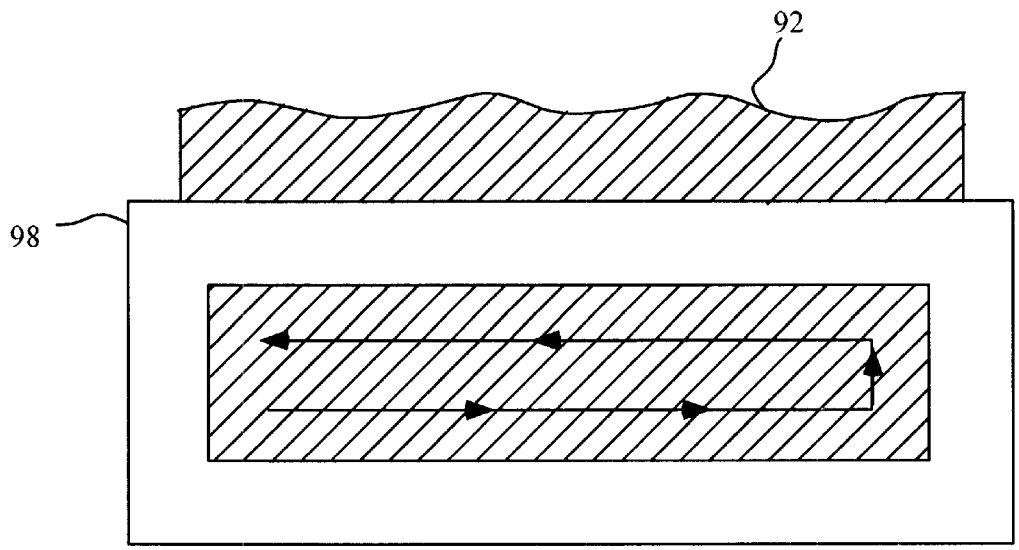
Figure 23:
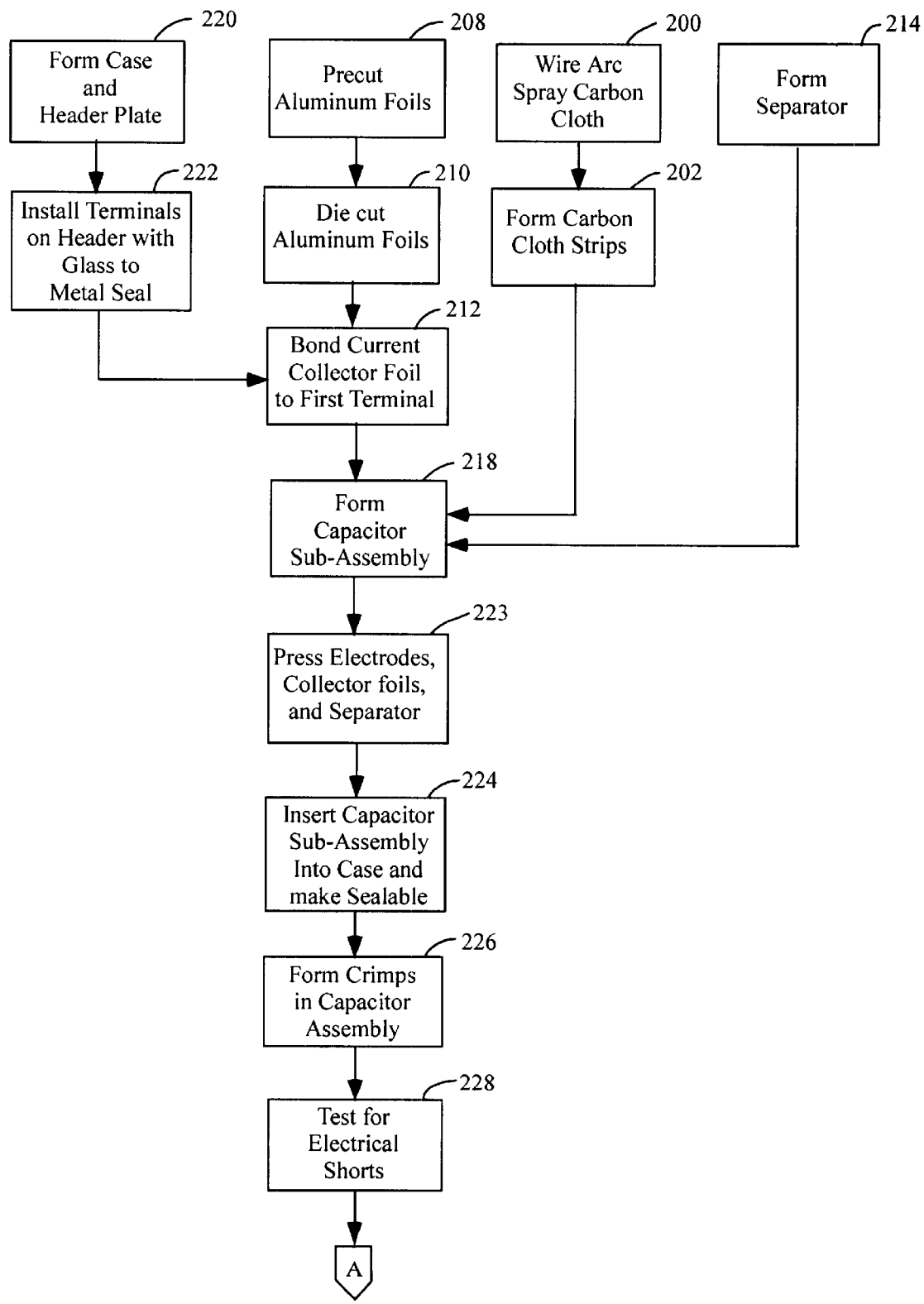
FIGS. 23 and 24 are a flowchart of steps traversed in the manufacture of the double layer capacitor of FIG. 1 in accordance with the embodiment of FIGS. 12 through 22.
Figure 24:
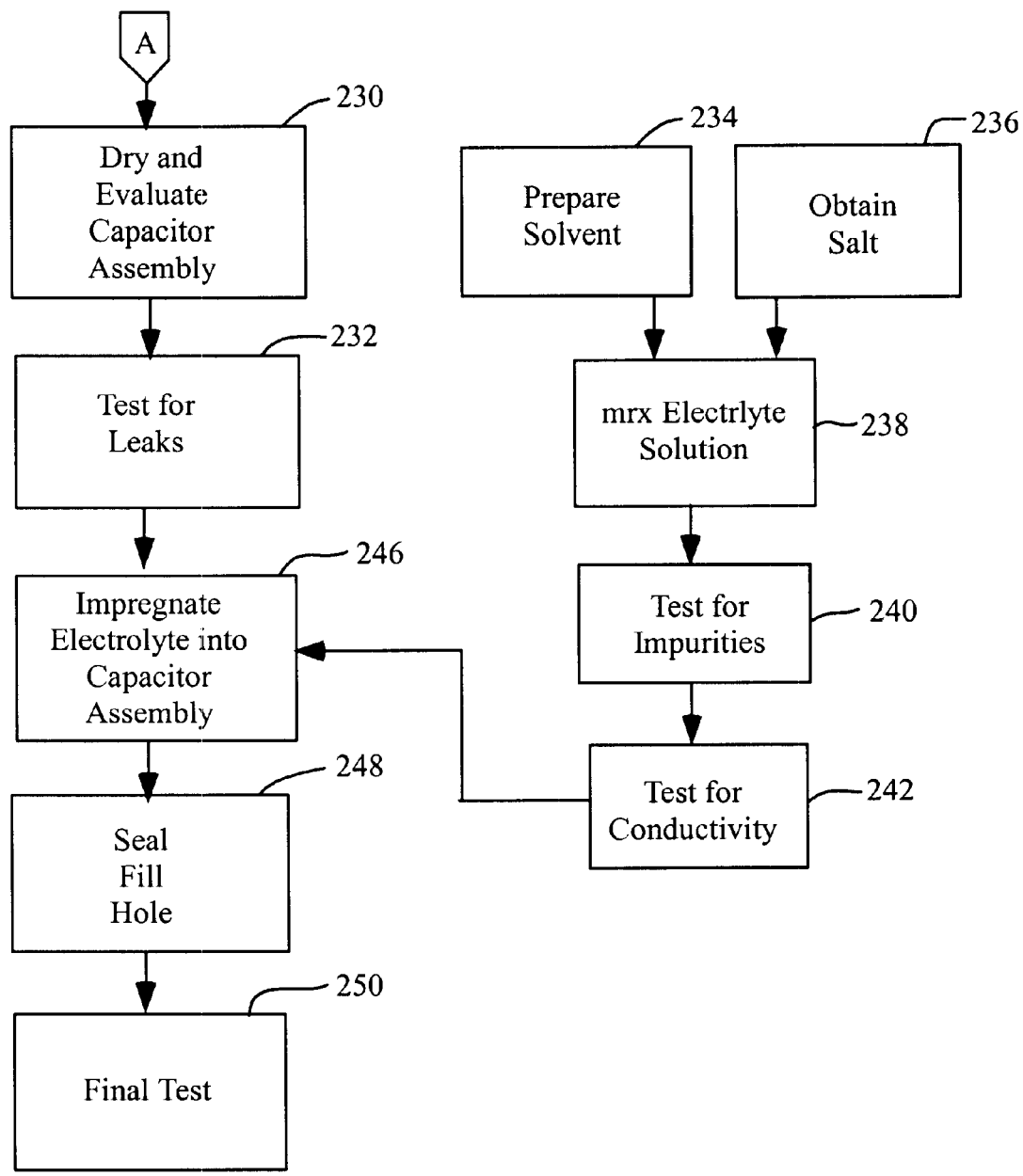

The particular geometry illustrated in FIG. 1 is provided for illustration purposes. A preferred geometry in accordance with the present teachings is illustrated below in FIGS. 12 through 22, with FIGS. 2 through 5 conceptually illustrating particular features of the present teachings; FIGS. 6 through 9 illustrating electrical equivalents, in particular, internal resistance components that are minimized by the present teachings; FIGS. 10 and 11 illustrating aspects of a manufacturing processes for the aluminum impregnated carbon fiber cloth electrodes; FIGS. 23 and 24 illustrating a manufacturing process for the double layer capacitor of the present teachings using a flow diagram; and FIGS. 25 and 26 providing experimental evidence of the long life aspects of the present teachings.

Referring back to FIG. 1, The aluminum impregnated carbon cloth electrodes 12, 14 are preferably formed from a porous carbon fiber cloth (carbon cloth preform) or, alternatively, carbon paper preform, which is impregnated with molten metal, e.g., aluminum, titanium, or copper, or vaporized molten metal, e.g., aluminum, titanium, or copper.

The porosity of the aluminum impregnated carbon cloth electrodes 12, 14 is closely controlled during the impregnation of the metal into the carbon fiber cloth to maintain a high surface area to volume ration permitting a sufficient amount of the electrolyte 20 to be introduced into the double layer capacitor 10 and, in particular, to penetrate pores of the carbon fiber cloth, thus maximizing the interfacial area (surface area) between the aluminum impregnated carbon cloth electrodes and the electrolyte.

Each of the current collector plates 22, 24 is electrically coupled, respectively, to one of the aluminum impregnated carbon cloth electrodes 12, 14. Preferably, the current collector plates 22, 24 are thin layers of aluminum foil, or similar thin sheet high conductivity material.

The porous separator 18 is placed between the aluminum impregnated carbon cloth electrodes 12, 14 with the current collector plates 22, 24 being oriented away from the porous separator 18. The porous separator 18 is preferably made from a highly porous material that acts as an electronic insulator between the aluminum impregnated carbon cloth electrodes 12 and 14, but that allows fluid communication, and in particular, ionic current flow through the porous separator 18. The purpose of the porous separator 18 is to assure that the aluminum impregnated carbon electrodes 12, 14 are never mechanically in direct contact with one another. Such contact between electrodes would result in a short circuit (i.e., electronic current, as opposed to ionic current) between the electrodes and thus rapid depletion of charges stored in the aluminum impregnated carbon cloth electrodes 12, 14 and a subsequent inability to store charge in the aluminum impregnated carbon cloth electrodes 12, 14. The porous nature of the porous separator 18, however, allows movement of ions (ionic current) in the electrolyte 20 between the aluminum impregnated carbon cloth electrodes 12, 14, and thus, in other words, ionic current to flow in the electrolyte between the electrodes 12, 14. The preferred porous separator 18 is a porous polypropylene-based or polyethylene-based sheet approximately 1 mil (0.001 inches) thick. If desired, the polypropylene or polyethylene separator may be initially soaked in the electrolyte 20 prior to inserting it between the aluminum impregnated carbon cloth electrodes 12, 14, although such pre-soaking is not required.

The case 11 may be any known means commonly used with double layer: capacitors. A preferred type of packaging, using an outer can onto which is welded a header (including a hermetic glass-to-metal seal, for a passthrough electrode, and a welded electrode, for a "can electrode"), is described hereinafter with reference to FIGS. 11 through 220.

In order to maximize energy density of the double layer capacitor 10, it is an advantageous to minimize the weight of the case 11.

Packaged double layer capacitors are typically expected to weigh not more than 25 percent of the double layer capacitor unpackaged.

The terminals 28, 29 extend from the current collector plates 22, 24 through the case 11 and are adapted for connection with an electrical circuit (not shown). In a preferred configuration, described hereinbelow, one of the current collector plates is electrically coupled to the case 11, with the corresponding terminal being welded to a header plate (which is, in turn, welded to the case).

Examples of double layer capacitors made using aluminum impregnated carbon cloth electrodes are shown in U.S. Pat. No. 5,621,607, issued Apr. 15, 1997 for HIGH PERFORMANCE DOUBLE-LAYER CAPACITORS INCLUDING ALUMINUM CARBON COMPOSITE ELECTRODES, by Farahmandi, et al., and in U.S. Pat. No. 5,777,428, issued Jul. 7, 1998, for ALUMINUM-CARBON COMPOSITE ELECTRODE AND METHOD FOR MAKING SAME, by Farahmandi, et al., and U.S. application Ser. No. 08/686,580, filed Jul. 16, 1996, for METHOD OF MAKING A HIGH-PERFORMANCE ULTRACAPACITOR, by Farahmandi, et al., and U.S. Pat. No. 5,862,035, issued Jan. 19, 1999, for MULTI-ELECTRODE DOUBLE-LAYER CAPACITOR HAVING SINGLE ELECTROLYTE SEAL AND ALUMINUM IMPREGNATED CARBON CLOTH ELECTRODES, by Farahmandi, et al.; and MULTI-ELECTRODE DOUBLE-LAYER CAPACITOR HAVING SINGLE ELECTROLYTE SEAL AND ALUMINUM-IMPREGNATED CARBON CLOTH ELECTRODES, by Farahmandi, et al, filed currently herewith, all of which are incorporated herein by reference.

The aluminum impregnated carbon cloth electrodes 12, 14 are sufficiently porous, and preferably have a sufficient aluminum impregnated within the carbon cloth such that an equivalent series resistance of each electrode when used, for example, in a 2.3–3.0 volt cell is about 1.5 $\Omega$ cm$^2$ or less, and the capacitance of each aluminum impregnated carbon cloth (or carbon paper) electrode 12, 14 is approximately 29 F/g or greater. Such large capacitance is achievable due to the large surface area made available through the use of carbon cloth (or carbon paper) and a very small separation distance between capacitor layers.

Many of the attendant advantages of the present double layer capacitor result from the preferred methods of fabricating the aluminum impregnated carbon cloth electrodes 12, 14, the preferred method of connecting the current collector plates 22, 24, and the use of a high performance electrolyte. Each of these aspects of the invention are discussed in further detail below.

As identified above, the aluminum (or other high conductivity material) impregnated carbon cloth electrodes 12, 14 are preferably made from a porous carbon cloth preforms (carbon fiber cloth) or carbon paper preforms (carbon fiber paper) which are impregnated with molten liquid or vaporized metal, preferably aluminum, titanium, or copper. In addition to carbon fiber cloth and carbon fiber paper, the aluminum impregnated carbon cloth electrodes 12, 14 can be fabricated from any suitable activated carbon fiber material such as carbon fiber felt or other activated carbon fiber substrates having a sufficient porosity to receive the molten aluminum (or other high conductivity material) and ultimately the electrolyte solution.

The aluminum is volumetrically impregnated deep into the tow of the individual fiber bundles of activated carbon fibers within, for example, the carbon fiber cloth, as explained more fully below. The result of impregnating the aluminum into the tow of the carbon fiber bundles is a low lateral (or transverse) resistance current path between the activated carbon elements within the carbon fiber cloth and the current collector plates. In addition, the aluminum decreases resistance between the activated carbon elements. At the same time, with the carbon fiber cloth impregnated, and not merely coated, but at the same time not saturated or encased, with aluminum, the aluminum impregnated carbon cloth electrode also remains sufficiently porous so that the electrolytic solution, preferably a non-aqueous electrolytic solution, thoroughly infiltrates the pores of the activated carbon fibers.

The fabrication process for the aluminum impregnated carbon cloth electrodes 12, 14 of the double layer capacitor 10 starts with the fabrication of the carbon fiber cloth or carbon fiber paper. The carbon fiber cloth or carbon fiber paper is typically a manufactured paper or cloth preform of high surface area activated carbon fibers. The preferred carbon fiber preform is a carbon fiber cloth. The carbon fiber cloth is preferably a commercially available carbon fiber cloth which uses woven carbon fiber bundles made up of activated carbon fibers having a surface area no less than 100 $m^2/g$ and typically approximately 500 to 3000 $m^2/g$ and having a diameter of approximately 8–10 $\mu m$. The carbon fiber cloth typically has more structural stability than carbon fiber paper. The surface area and other dimensions of the activated carbon fibers, however, can be tailored to meet the requirements of the application in which it is used, regardless of whether carbon fiber cloth, carbon fiber paper or another.

Impregnation of the carbon fiber cloth with molten metal, such as aluminum, titanium, or copper, is preferably accomplished using arc spraying (or plasma spraying) technique, as described more fully below. Arc spraying molten metal onto the surface of a carbon fiber cloth has previously been used in double layer capacitor construction as a means for forming a current collector at the surface of the carbon fiber cloth. This, by definition, involves depositing a thick, substantially impermeable layer of metal onto the surface of the carbon fiber cloth, as opposed to impregnating the carbon fiber cloth with an arc sprayed molten metal, i.e., to volume impregnate the carbon fiber cloth with the sprayed metal so as to reduce contact resistance between the activated carbon fibers of the carbon fiber cloth and between the activated carbon fibers and the current collector plates 22, 24, thereby forming a very low resistance carbon/metal composite electrode made up of both the carbon fiber cloth (which is made of activated carbon) and the impregnated metal.

The arc spray technique is controlled to penetrate into the carbon fiber cloth as described more fully below. Control is accomplished by adjusting electrical current and gas jet strength to a spray unit, temperature and pressure of the molten aluminum, distance of the plasma spray unit from the carbon fiber cloth, sweep rate of the spray unit, and the ambient airflow during the spraying process, i.e., the flow of exhaust air through the carbon fiber cloth in a direction away from the spray unit (i.e., in the same direction as the spray). Advantageously, the bulk resistivity of the carbon cloth is dramatically reduced when arc spraying is used to impregnate the carbon fiber cloth with aluminum, as is contact resistance between the current collector foils 22, 24 and the aluminum impregnated carbon cloth electrodes 12, 14.

Figure 2:
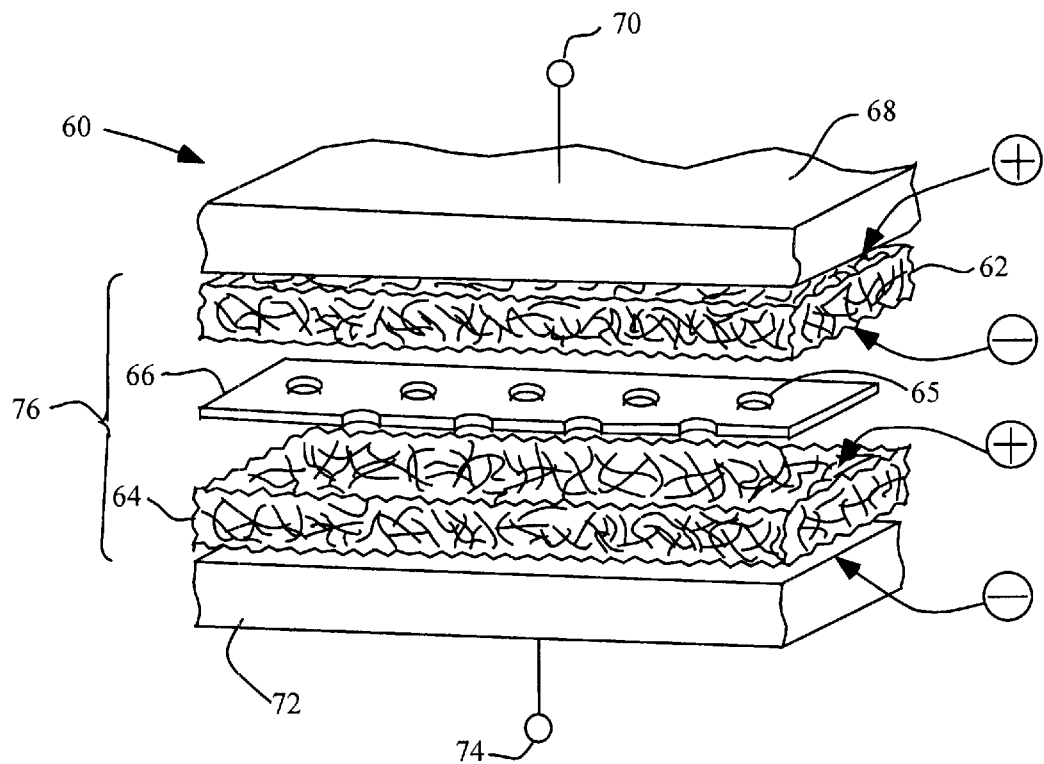
FIG. 2 schematically shows internal components of a basic double layer capacitor, such as the double layer capacitor of FIG. 1.

Turning to FIG. 2, a schematic representation is shown of a double layer capacitor 60. The double layer capacitor 60 includes the aluminum impregnated carbon cloth electrodes 62, 64 electrically separated by the porous separator 66. The aluminum impregnated carbon cloth electrodes 62, 64, as explained in more detail elsewhere herein, comprise a relatively dense, but compressible, weave of activated carbon fibers, in carbon fiber bundles forming a carbon fiber cloth, in to which molten aluminum has been impregnated using, for example, an arc spray process.

A first of the aluminum impregnated carbon cloth electrodes 62 is in contact with a current collector plate 68, which plate 68 is in turn connected to a first terminal 70 of the double layer capacitor 60. Similarly, the other aluminum impregnated carbon cloth electrode 64 is in contact with another current collector plate 72, which plate 72 is connected to a second terminal 74 of the capacitor 60. A region between the aluminum impregnated carbon cloth electrodes 62, 64, as well as all of the available spaces and voids within the aluminum impregnated carbon cloth electrodes 62, 64, is filled with a highly conductive non-aqueous electrolyte solution 76 (or electrolyte solution 76). The ions of the electrolyte solution 76 are free to pass through pores or holes 65 of the porous separator 66; while, at the same time, the porous separator 66 prevents the first aluminum impregnated carbon cloth electrode 62 from physically contacting, and hence electrically shorting with, the other aluminum impregnated carbon cloth electrode 64.

A preferred porous separator, is made using, for example, polypropylene. Polypropylene includes pore openings having dimensions on the order of 0.04 by 0.12 $\mu m$. This size pore prevents the activated carbon fibers of the carbon fiber cloth, which have a diameter on the order of 8–10 $\mu m$, from poking through the pores, but allows ionic current flow through the porous separator 66. Another suitable porous separator is made using polyethylene. Polyethylene generally has pore sizes on the order of 0.1 $\mu m$ diameter or less, thereby also preventing the activated carbon fibers, having a minimum diameter of 8 $\mu m$, from poking therethrough, while still allowing ionic current to flow through the porous separator 66.

In operation, when an electrical potential is applied across the terminals 70 and 74 of the double layer capacitor, and hence across the aluminum impregnated carbon cloth electrodes 62, 64, a polarized liquid layer forms within the electrolyte solution 76 at each of the aluminum impregnated electrodes 62, 64 immersed in the electrolyte solution 76. It is these polarized liquid layers that store electrostatic energy and function as the double layer capacitor—i.e., that function as two capacitors in series. More particularly, as conceptually depicted in FIG. 2 by the "+" and "−" symbols (representing the electrical charge at the electrode-electrolyte interface of each aluminum impregnated carbon cloth electrode that is immersed in the electrolyte solution 76), when a voltage is applied across the aluminum impregnated carbon cloth electrodes 62, 64, e.g., when the first aluminum impregnated carbon cloth electrode 62 is charged positive relative to the other aluminum impregnated carbon cloth electrode 64, a double layer is formed (symbolically depicted by the two "+/−" layers shown in FIG. 2) by the polarization of the electrolyte solution ions due to charge separation under the applied electric field and also due to dipole orientation and alignment of electrolyte solution molecules over the entire surface of the aluminum impregnated carbon cloth electrodes 62, 64. This polarization stores energy in the capacitor 60 according to the following relationships:

$$C = k_e A / d \quad (1)$$

and $$E = CV^2 / 2 \quad (2)$$

where C is the capacitance, $k_e$ is the effective dielectric constant of the double layer, d is the separation distance between the layers, A is the surface area of the aluminum impregnated carbon cloth electrodes 62, 64 that is immersed in the electrolytic solution, V is the voltage applied across the aluminum impregnated carbon cloth electrodes 62, 64, and E is the energy stored in the double layer capacitor 60.

In the present embodiment of the double layer capacitor, the separation distance d is so small that it is measured in angstroms, while the surface area A, i.e., the surface area "A" per gram of electrode material, may be very large. Hence, as can be seen from Eq. (1), when d is very small, and A is very large, the capacitance will be very large.

In the present embodiment, the surface area "A" is large because of the make-up of the aluminum impregnated carbon cloth electrodes 62, 64. Each of the aluminum impregnated carbon cloth electrodes 62, 64 comprises a weave of carbon fiber bundles forming a carbon fiber cloth. Each carbon fiber bundle is made up of many activated carbon fibers.

Figure 3:
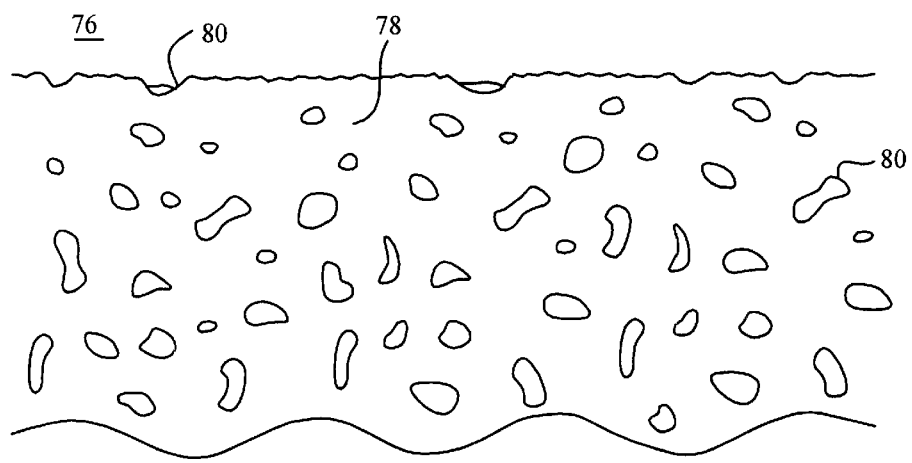
FIG. 3 conceptually illustrates an extremely close-up view of a single activated carbon fiber such as may be used in electrodes of the double layer capacitor of FIG. 1.

Referring to FIG. 3, a conceptual illustration is shown of an extremely close up view of a small section of single activated carbon fiber 76. As can be seen, each individual activated carbon fiber 76 is pitted with numerous pits holes and pores 80, as is conceptually illustrated. The individual activated carbon fiber 80, as previously indicated, typically has a diameter on the order of 8–10 $\mu$m; while the pits, holes and pores 80 of the individual activated carbon fiber 76 have a typical size of about 40 angstroms. When the activated carbon fiber 76 is immersed in an electrolyte solution 76, each pit or hole 80 significantly increases the surface area of the activated fiber that is exposed to the electrolyte solution 76.

Because there are a large number of activated carbon fibers 78 in each fiber bundle, and because there are numerous bundles within the weave of the carbon fiber cloth, the result is a three-dimensional aluminum impregnated carbon cloth electrode structure that allows the electrolyte solution to penetrate into the weave of the carbon fiber cloth, into the bundles of the weave, and into the holes and pores of the individual activated carbon fibers of the carbon fiber bundles, so as to contact all, or most all, of the surface area of the fibers, thereby dramatically increasing the surface area "A" of the electrode over which the double layer of charged molecules is formed.

By way of example, a suitable carbon cloth known in the art may be used to make the aluminum impregnated carbon cloth electrodes 62, 64 (FIG. 2) of the present embodiment. The diameter, for example, of the activated carbon fibers of such cloth, such as the activated carbon fibers 76, 78 shown in FIG. 3, is on the order of 8 microns. ($8 \times 10^{-6}$ m); whereas the overall thickness of the carbon fiber cloth is about 0.53 millimeters (mm). The average diameter of the pores in the activated carbon fibers is some 44 angstroms, and the pore/void volume is about 1.2 ml/g. It should be noted that the pore/void volume results from three different types of voids or pores in the cloth: (1) the pores or pits in the individual activated carbon fibers (such as the pores 80 shown in FIG. 3 that cover most of the surface area of the individual activated carbon fibers), (2) the space between the activated carbon fibers that form a carbon fiber bundle (which space, for purposes of the present invention, when viewed in a cross section, such as in FIG. 5, is referred to as the "tow" of the carbon fiber bundle); and (3) the voids between the carbon fiber bundles that are woven to form the carbon fiber cloth. Such pore/void volume results in an overall surface area of the carbon fiber cloth of about 2500 m$^2$/g. Because of the pore/void volume of the carbon fiber cloth, the carbon fiber cloth not only has a high surface area, but is somewhat spongy, and therefore is compressible. The density of the cloth is typically about 0.26 g/cm$^3$, resulting in an theoretical effective area/unit-volume (i.e. void volume) of about 650 m$^2$/cm$^3$. With such an area/unit-volume, it is thus possible (see Eq. (1)) to achieve capacitances on the order of 6 F/cm$^3$.

Achieving a high capacitance, however, is only part of the advantage of the present embodiment. If such high capacitance is to be of practical use in a capacitor, the capacitor must be able to store and discharge energy in a relatively quick time period, i.e., it must be able to perform as a capacitor. The charge/discharge time of a capacitor, as discussed more fully below, is governed by the internal resistance of the capacitor. The lower the internal resistance, the shorter the charge/discharge time.

Referring for a moment to FIG. 6, the internal resistance of the double layer capacitor 60 of the present embodiment, as depicted in FIG. 2, is made up of several components, as illustrated in the equivalent circuit diagram of the double layer capacitor 60 shown. As seen, the internal resistance of the double layer capacitor 60 includes a contact resistance, $R_C$, which represents all of the resistance in the current path between the capacitor terminal 70 up to the aluminum impregnated carbon cloth electrode 62 (represented in FIG. 2 as the upper plate of capacitor $C_1$), or all of the resistance in the current path between the capacitor terminal 74 and the aluminum impregnated carbon cloth electrode 64 (represented in FIG. 2 as the lower plate of capacitor $C_2$).

As further seen, internal resistance of the double layer capacitor 60 also includes an electrode resistance, $R_{EL}$, which represents the resistance within the aluminum impregnated carbon cloth electrode 62 (or within the aluminum impregnated carbon cloth electrode 64) between collector plate/carbon fiber cloth interface at the surface of the carbon fiber cloth used to make the aluminum impregnated carbon cloth electrode and all of the individual activated carbon fibers used within the carbon fiber cloth, i.e., $R_{EL}$ represents the internal contact resistance between the activated carbon fibers within the aluminum impregnated carbon cloth electrode 62 (or within the other aluminum impregnated carbon cloth electrode 64). Additionally, an electrolyte solution resistance, $R_{ES}$, exists relative to the electrolytic solution 76; and a separator resistance, $R_{SEP}$, exists relative to the porous separator 66.

Any energy stored within the double layer capacitor 60 must enter or exit the double layer capacitor 60 by way of an electrical current that flows through $R_C$, $R_{EL}$, and $R_{ES}$ of one of the aluminum impregnated carbon cloth electrodes 62, through $R_{SEP}$, and through $R_{ES}$, $R_{EL}$ and $R_{ES}$ of the other aluminum impregnated carbon cloth electrode 64. Thus, it is seen that in order for practical charge/discharge times to be achieved, the values of $R_C$, $R_{EL}$, $R_{ES}$, and $R_{SEP}$, which in combination with the total capacitance C or $C_1+C_2$ define the time constant $\tau_C$ of the double layer capacitor 60, must be kept as low as possible.

The resistance of the separator, $R_{SEP}$, is a function of the porosity and thickness of the separator. A preferred separator material is polypropylene having a thickness of about 0.001 inches (0.025 mm). An alternative separator material is polyethylene, also having a thickness of about 0.001 inches (0.025 mm).

The polypropylene-based separator inherently has a smaller pore size with about 20–40% porosity. The polyethylene-based separator has a larger pore size with about 60–80% porosity yet has a more tortuous or twisted path than the polypropylene separator in which the electrolyte ions may flow. The polypropylene separator has a sheet structure white the polyethylene separator has a more lamellar structure.

The resistance of the electrolyte solution $R_{ES}$ is determined by the conductivity of the particular electrolyte solution that is used. In selecting the type of electrolyte solution to use, several tradeoffs must be considered. Aqueous (inorganic) electrolyte solutions generally have a higher conductivity than do non-aqueous (organic) solutions (e.g., by a factor of 10 to 100). However, aqueous solutions limit the working voltage of the capacitor to around 0.5 volts to 1.0 volt. Because the energy stored in the double layer capacitor 60 is a function of the square of the voltage (see Eq. (2) above), high energy applications are probably better served using a non-aqueous electrolyte solution, which permit cell voltages on the order of 2.0 to 3.0 volts, even though non-aqueous electrolytes have a lower conductivity.

As previously indicated, the preferred electrolyte solution for use with the double layer capacitor described herein is made from a mixture of acetonitrile ($CH_3CN$) and a suitable salt, which mixture exhibits a conductivity on the order of 50 $ohm^{-1}/cm$. While the inventors contemplate that the use of non-aqueous electrolyte solutions may be advantageous in some circumstances, alternative electrolyte solutions may be preferred. For example, several alternative electrolyte solutions are disclosed in the previously cited U.S. patent application Ser. No. 08/319,493, for MULTI-ELECTRODE DOUBLE LAYER CAPACITOR HAVING SINGLE ELECTROLYTE SEAL AND ALUMINUM-IMPREGNATED CARBON CLOTH ELECTRODES, by Farahmandi, et al., filed Oct. 7, 1994.

The use of non-aqueous (organic) electrolyte solutions, however pose a significant problem, addressed herein below, of leakage, particularly in smaller devices, where any extremely small leak rates are tolerable. Specifically, unlike an aqueous electrolyte solution designs, where a primary concern is leakage of the electrolyte out of the capacitor case, in non-aqueous electrolyte solution designs, a significant problem, unsolved by known prior approaches, is that of leakage of contaminants, namely water and air, into the capacitor case. Over time, leakage of contaminants into the capacitor case will deplete the non-aqueous electrolyte solution, lowering capacitance of the capacitor and raising internal resistance.

This leakage is less problematic in larger devices (higher volume electrolyte solution devices) because at a given time, for a given leak rate, contaminated electrolyte solution at any given time will constitute a lower percentage of the total volume of electrolyte solution. In smaller devices (lower volume electrolyte solution devices) such as described with reference to FIGS. 12–24, however, the contaminated electrolyte solution constitutes a higher percentage of the total volume of electrolyte solution, at the given time, with the given leak rate.

Thus, as described below, a significant benefit argument offered by the present embodiment is the employment of a hermetically sealed case (hereinafter being defined as having a leak rate of less than 0.00005 $g/m^2/day$ at 73° F. and less than 0.00009 $g/m^2/day$ at 110° F. (see Table 5), whereby long-life, small volume, non-aqueous electrolyte solution, double layer capacitor designs are, for the first time of which the inventors are aware, enabled. Manufacturing and assembly techniques that achieve a hermetically sealed casing are the topic of further discussion below. FIGS. 25 and 26 illustrate the differences in performance characteristics between similar sized double layer capacitors, one with a hermetic seal and on without a hermetic seal.

Furthermore, as described below, it is desirable to use double layer capacitor terminals that are solderable, to a printed circuit board, for example. In such a case, the double layer capacitor case containing the hermetic seal will be exposed to a significant thermal source. Thus, solderable terminals should be comprised of a material having approximately the same thermal coefficient of expansion as the hermetic seal itself, otherwise the double layer capacitor will experience unintended leakage, between the hermetic seal and the solderable terminal. The specific types of solderable terminals are discussed with reference to the embodiment in FIGS. 12 through 24.

Another significant advantage of the present embodiment, that is important to achieving, in a practical way, very large capacitance double layer capacitors, is low internal resistance. Generally, the contact resistance $R_C$, in combination with the electrode resistance $R_{EL}$ (both of which are defined above), represent a significant source of internal resistance of the double layer capacitor 60. A high electrode resistance has heretofore been a major stumbling block in the development of practical, commercially viable, high energy density, double layer capacitors. A key feature of the present embodiment is to provide a double layer capacitor having a very low electrode resistance in combination with the high energy density achieved with the very high surface area of the aluminum impregnated carbon cloth electrodes. A major objective of the present embodiment is to reduce $R_C+R_{EL}$ to a value that is small in comparison to $R_{SEP}$. To that end, much of the discussion that follows focuses on manufacturing and assembly techniques that reduce the electrode resistance, $R_{EL}$, as well as the contact resistance, $R_C$, in a small size, high energy density, long life, double layer capacitor.

To further illustrate the significant role that the electrode resistance $R_{EL}$ plays in the operation of the double layer capacitor 60 of the present embodiment, reference is next made to FIG. 7. FIG. 7 shows an equivalent circuit diagram of an aluminum impregnated carbon cloth electrode double layer capacitor 60. Unlike the representation in FIG. 6, the electrode resistance $R_{EL}$ is represented as a series of separate resistances $R_{EL1}$, $R_{EL2}$, $R_{ELn}$, signifying increasing resistance as a function of distance in the activated carbon fiber (electrically speaking) through which a particular portion of the current travels before passing into the electrolyte (as ionic current).

Typically, current entering and exiting activated carbon fibers near the current collector, sees a relatively lower electrode resistance than does current that travels through activated carbon fibers through the entire thickness of the carbon fiber cloth before passing into the electrolyte.

At the same time, current that passes into the electrolyte near the current collector foil (after having traveled relatively little distance through the activated carbon fibers) has a greater path distance through the electrolyte solution and thus a greater electrolyte solution resistance $R_{ES}$, than does current that passes into the electrolyte solution after having traveled through the entire thickness of the carbon cloth, and thus has a lesser electrolyte solution resistance $R_{ES}$. FIG. 7 depicts schematically the inverse relationship between $R_{EL}$ and $R_{ES}$ through a series/parallel circuit having a "ladder" structure on which the individual capacitance functions of each unit of surface area are the "rungs" of the ladder and a series of individual electrode resistances form one "leg" of the ladder, and a series of individual electrolyte solution resistances form another "leg" of the ladder. The contact resistance is coupled to one end of the one leg, and the separator resistance is coupled to another end of the other leg, such that current traveling through each individual capacitance has "seen" at least one of the electrode resistances and at least one of the electrolyte solution resistances, with the number of, i.e., the amount of resistance of, the electrode resistances being inversely proportional to the number of, i.e., the resistance of, the electrolyte solution resistances.

FIG. 7 further illustrates a first portion of current taking path "A" entering and exiting the carbon fiber cloth relatively near to the current collector foil/carbon fiber cloth interface, and traveling a relatively greater distance through the electrolyte solution, a second portion of current taking path "B" entering the carbon fiber cloth at the current collector foil/carbon fiber cloth interface and exiting at an intermediate position, with an intermediate distance of travel through the electrolytic solution, and a third portion of current taking path "C" entering the carbon fiber cloth at the current collector foil/carbon fiber cloth after having passed through the entire thickness of the carbon fiber cloth, with a relatively shorter distance of travel through the electrolyte solution.

Understanding of these sources of resistance by the inventors remains significant to their success at reducing the resistances to a level that permits the making of a commercially viable, practical, high-voltage, low internal resistance, small size, long life, double layer capacitor.

Advantageously, in the present embodiment, total resistance seen by the entire amount of current passing through the double layer capacitor is no more than 125 mΩ.

Figure 8:
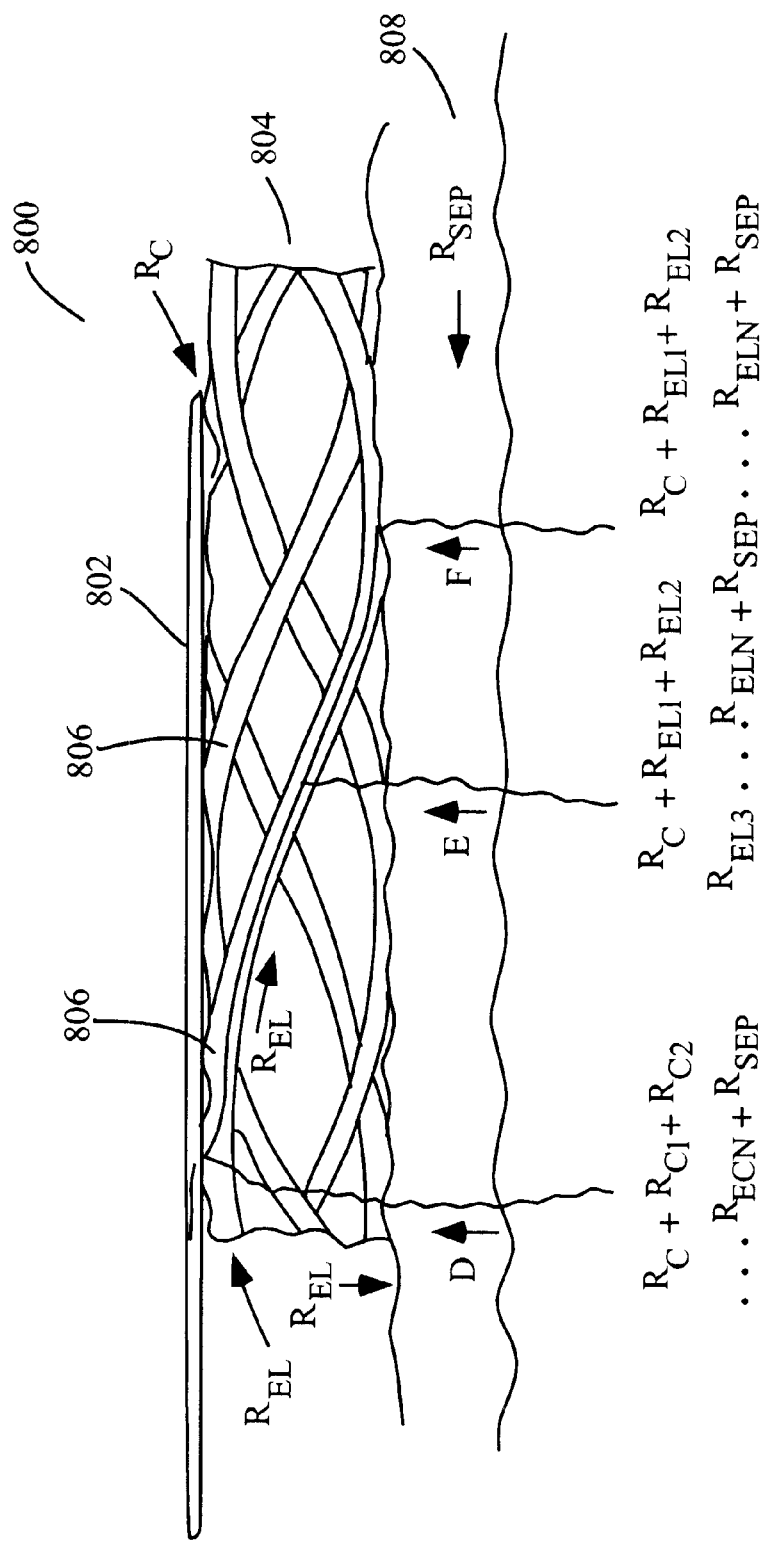
FIG. 8 is a cross-sectional representation of various current paths through which a charge may pass as it flows through a collector plate, the electrode, an electrolyte, and a separator (and various path resistances associated therewith) in the double layer capacitor of FIG. 1.

Referring to FIG. 8, a diagram having a single electrode 804 with a single current collector 802 and a single separator 808 is shown. The diagram 800 represents multiple paths charges may take as the current flows from the separator 808 through the electrode 804 and electrolytic solution to the current collector 802.

A charge may take path "D" through the electrode 804 first experiencing $R_{SEP}$, then enter the electrode 804 until it enters a carbon fiber bundle 806. Then, the charge travels axially through the carbon fiber bundle 806 to the current collector 802. The charge experiences resistance from the electrode 804, $R_{EL}$, and resistance from the electrolyte solution, $R_{ES}$. The current then flows through the collector foil 802, experiencing $R_C$. As shown by the different paths "D", "E", and "F", the amount of electrode and solution resistance varies for each charge and the path it takes. A charge taking path "D" experiences more solution resistance ($R_{ES}$) and less electrode resistance ($R_{EL}$) than a charge in path "F", for example. Each path generates a separate capacitance as well. The effective capacitance is the sum of the separate capacitances $C_1$ through $C_N$.

Referring to FIG. 9, shown is a simplified circuit that illustrates the use of a double layer capacitor as a power source to deliver energy to a load, $R_L$. In FIG. 9, all of the capacitor internal resistances shown in FIG. 6, including the contact resistance $2 \times R_C$ associated with both terminals, the aluminum impregnated carbon cloth electrode resistances $2 \times R_{EL}$, the electrolytic solution resistances $2 \times R_{ES}$, and the separator resistance $R_{SEP}$ (if not sufficiently low to be neglected), are included in the capacitor internal resistance $R_Z$.

The total resistance $R_T$ of the power delivery circuit in FIG. 7 is $$R_T = R_Z + R_L. \tag{3}$$

The total time constant τ of the power delivery circuit is thus:

$$\tau = R_T C, \tag{4}$$

whereas the time constant $\tau_C$ of just the capacitor is $$\tau_C = R_Z C. \tag{5}$$

The voltage developed across the load $V_L$ is $$V_L = V_O(R_L/R_T) = V_O(1 - R_C/R_T) \tag{6}$$

and the power delivered to the load is $$P = IV_L = IV_O(1 - R_C/R_T) = IV_O(1 - CR_C/CR_T) \tag{7}$$

or $$P = IV_O(1 - \tau_C/\tau). \tag{8}$$

The expression $(1 - \tau_C/\tau)$ represents the efficiency rating ε of the power delivery circuit, i.e., $$\epsilon = (1 - \tau_C/\tau). \tag{9}$$

The degree to which the power source (in this case the double layer capacitor C charged to a voltage $V_O$) is able to efficiently deliver power to the load, $R_L$ is thus highly dependent upon the characteristic RC time constant of the capacitor $\tau_C$. The characteristic RC time constant of the capacitor, in turn, is directly related to the internal resistance of the capacitor, $R_Z$, as defined above. For an efficient, practical, high speed power delivery circuit to be achieved using the double layer capacitor C, it is thus apparent that the internal resistance of the capacitor, $R_Z$, must be minimized so that a low time constant of the capacitor $\tau_C$ can be realized.

Advantageously, the present embodiment provides an aluminum impregnated carbon cloth electrode double layer capacitor of the type represented in the equivalent circuit of FIG. 9 that, when configured substantially as described below, achieves a very low internal resistance, i.e., on the order of 150 mΩ or less for the embodiment shown in FIGS. 12–24. Significantly, a double layer capacitor operating in accordance with the specifications shown in Table 1 exhibits a time constant $\tau_C$ of about 1.2 seconds. The energy density achieved is in the range of 2.9–3.5 W-hr/kg, and the power rating is over 1000 W/kg.

TABLE 1

Performance Specifications of PC-10

| Parameter | Value | Units |
|---|---|---|
| Capacitance | 8 | Farad |
| Tolerance | ±10 | % |
| Rated Voltage | 2.3 | Volts |
| Rated Energy | 21 | Joules |
| ESR* | 150 | mΩ |
| @100 Hz | 90 | mΩ |
| Rated Current | 3 | Amps |
| Operating Temp | −20 to 60 | Celsius |
| Storage Temp | −40 to 85 | Celsius |
| Leakage Current (after 72 hrs) | 0.02 | milliamps |
| Case Style | Stainless Steel can with header plate | |
| Electrical Connection | Two solderable platinum coated molybdenum pins attached to case. One pin is electrically insulated from the case and the other pin is not. Electrical connection may also be through case surface contact. | |
| Case Dimensions | 24 × 31 × 4.5 | mm |
| Weight | 6.5 | g |
| Electrolyte: | Organic Impregnate (solvent + salt) solvent: acetonitrile ($CH_3CN$) salt: tetraethylammonium tetraflouraborate $(CH_3CH_2)_4N^+BF_4^-$ | |

(*ESR Electrode Series Resistance)

Hermetically-Sealed Double Layer Capacitor, PC 10

At this point, a more detailed description of a particular embodiment of a hermetically sealed double layer capacitor, also referred to as the PC 10, will be presented. The following description makes reference to both structural depictions, in FIGS. 10 through 22, and process depictions, in FIGS. 23 and 24.

Impregnation of Metal into "Tow" of Carbon Fiber Cloth

With reference first to Block 200 of FIG. 23, and with reference also to FIGS. 10 and 11, an initial step to be carried out in making a hermetically sealed embodiment of the double layer capacitor 60 (FIG. 2) is to wire arc spray (also referred to as plasma spray) a carbon fiber cloth 92 (FIG. 10) with molten aluminum 94 so that the molten aluminum 94 is impregnated deep into the tow of the activated carbon fibers of the carbon fiber bundles woven into the carbon fiber cloth 92. The carbon fiber cloth 92 to be sprayed is preferably a commercially-available cloth.

As seen in FIG. 10, the carbon fiber cloth 92 is typically obtained in a roll 96. The roll 96 is typically about 36 inches wide. A length of carbon fiber cloth 92 is unrolled from the roll 96 and held in place, such as in a suitable frame 98 (FIG. 11) or by suitable guides (not shown) in a continuous manufacturing process.

Shown are an air compressor 110 having a primary line 114 and a secondary line 116, a source of electrical power 108, an x-y controller 102, and aluminum wires 106 and 104, all of which connect to an arc spray nozzle 100. The arc spray nozzle 100 has a jet spray nozzle 101 attached. Also shown are the carbon cloth 92, a backup mesh 93, an exhaust fan 112, and molten metal spray 94.

The arc spraying is done downward onto the carbon cloth 92 which is resting horizontally on a backup mesh 93, so as to take advantage of gravitational forces during impregnation of the metal into the carbon fiber cloth. The frame 98 is entirely optional as the carbon cloth 92 does not generally need to be held in place.

The jet spray nozzle 101 is actually three separate spray nozzles directed toward the carbon cloth 92. The air compressor 116 sends compressed air into the arc spray nozzle 100 through the primary line 114 at about 50 to 60 psi; and another line, the secondary line 116, carries compressed air into the jet spray nozzle 101 at about 40 psi. This secondary line 116 boosts the strength of the molten metal spray 94 against the carbon cloth 92, thus enhancing impregnation of the metal into the carbon fiber cloth, by enabling less aluminum to be sprayed in less time while achieving the same impregnation depth as a conventional wire arc spray technique.

Using this embodiment of a conventional wire arc spray technique, referred to as a jet spray technique, less aluminum is actually sprayed than in a conventional arc spraying approach that only uses a single arc spray nozzle, instead of an additional jet spray nozzle, allowing for a more effective impregnation of the aluminum into carbon cloth 92. Furthermore, the use of a jet spray nozzle 101 allows the impregnation process to be completed in much less time than a conventional arc spray process. Additionally, since less aluminum is sprayed in less time, the resulting layer of molten metal (e.g. aluminum) that is formed on the surface of the carbon cloth 92 is thinner that formed using the conventional wire arc spray technique.

It should be noted that the metal used to impregnate the carbon cloth is not limited to Aluminum. Other suitable metals, such as titanium or copper, may be used by the skilled artist.

The operating parameters used during the wire arc spray process are as follows: The electrical current used to melt the aluminum is 80–90 amperes at an arc voltage of about 31 V. The compressed air is maintained at a pressure of approximately 60 psi and 40 psi for the primary line 114 and the secondary line 116, respectively, in FIG. 11. The distance between the tip of the jet spray nozzle 101 and the cloth is between 4.5 to 6 inches. The complete spray pattern is traversed at a constant rate in a time period of about 1 second, compared to about 45 seconds using a conventional wire arc spray technique. The arc spray nozzle 100 and jet spray nozzle 101 are adjusted so that the stream of molten aluminum 94 covers the carbon cloth 92 as uniformly as possible with minimum overlap.

The frame 98 or other mechanism holds the carbon fiber cloth 92 in front of a backup mesh 93 (FIG. 11), between the backup mesh 93 and the jet spray nozzle 101. If used, the frame 98 exposes a "window" of the carbon fiber cloth 92 having approximate dimensions of 2.3 inches by 34.25 inches, to the arc spray of molten aluminum 94 (FIG. 11). The arc spray nozzle 100 and the attached jet spray nozzle 101 can be controlled by an X-Y controller 102 to provide a desired spray pattern on the carbon fiber cloth 92. Preferably, the carbon fiber cloth 92 is held horizontally during impregnation so that gravitational forces further enhance impregnation of the molten aluminum into the tow of the carbon fiber cloth 92.

The molten aluminum arc spray 94 is formed by feeding two aluminum wires 104, 106 from respective rolls of aluminum wire into the arc spray nozzle 100 at a controlled rate. The wires 104 and 106 are not limited to aluminum wires and may comprise another suitable metal, such as copper or titanium. Tips of the aluminum wires 104, 106 are held within the arc spray nozzle 100 a specified distance apart. A source of electrical power 108 causes an electrical current to flow through the aluminum wires 104, 106 and arc across the tips of the aluminum wires 104, 106. The electrical arcing causes the tips of the aluminum wires 104, 106 to melt and vaporize or atomize. As aluminum from the tips of the aluminum wires 104, 106 melts and vaporizes, the aluminum is carried out of the arc spray nozzle 100 in a plasma stream by a jet of compressed air, provided by the air compressor 110 and through the jet spray nozzle 101. As the aluminum is spent and carried away in the plasma stream 94, additional aluminum wire 104, 106 is metered into the arc spray nozzle 100 to maintain a desired gap for the arc across the tips of the aluminum wires 104, 106. In this manner, the aluminum wires 104, 106 are continually metered into the arc spray nozzle 100 so that a constant stream of vaporized, or molten, atomized aluminum can be directed at the carbon fiber cloth 92.

The vaporized or atomized stream of molten aluminum is sprayed onto and into the carbon fiber cloth 92 following, in one example, an over-up-and-back spray pattern, such as is shown in FIG. 11 using arrows within the frame 98. The backup mesh 93, which has mesh openings on the order of 0.25 in², allows the plasma flow to continue through the carbon fiber cloth 92 to optimize volume impregnation of the carbon fiber cloth 92 with the vaporized or atomized molten aluminum. The aluminum wires 104, 106 are preferably 99.5% pure aluminum having a diameter of about 1/16th of an inch.

In operation, all of the operative equipment shown in FIG. 10, e.g., the arc spray nozzle 100, jet spray nozzle 101, X-Y controller 102, frame 98, and wires 104, 106 are placed in an arc spray chamber (to confine the molten and vaporized or atomized aluminum). Air in the chamber is dried. An exhaust fan 112 maintains a constant flow of air through the chamber in a direction away from the jet spray nozzle 101 (preferably down). The carbon fiber cloth 92 is clamped in the frame 98, when used, and a single spray pattern is performed. Only one side of the carbon fiber cloth 92 is arc sprayed. Once sprayed, the carbon fiber cloth 92 is released from the frame 98. A new length of unsprayed carbon fiber cloth 92 is then indexed in the frame 98, as needed, for the next strip of the carbon fiber cloth 92 to be arc sprayed.

The complete spray pattern is traversed at a constant rate in a time period of about 1 second using the jet spray nozzle 101. The individual arc spray nozzles of the jet spray nozzle 101 are adjusted so that the stream of molten and vaporized or atomized aluminum covers the carbon fiber cloth 92 as uniformly as possible with minimum overlap.

Once the jet spraying process has been completed, a thin layer of aluminum is present on the front side of the carbon cloth 92, and there should be a slight visual pattern of the backup mesh 93 visible on the back side of the carbon cloth. Such pattern provides visual verification that at least some aluminum has penetrated all the way through the carbon cloth to optimize volume impregnation during the arc spraying process. As described above, the layer of aluminum is thinner than a layer formed using the conventional wire arc spray technique.

All of the equipment referenced in FIG. 10 is conventional. The details and manner of operating such equipment are known to those of skill in the art.

The purpose of spraying the carbon fiber cloth 92 with the aluminum is to reduce transverse resistance through the carbon fiber cloth 92. Measured data of the aluminum impregnated carbon fiber cloth electrode series resistance (ESR), taken before and after arc spraying and with various amounts of aluminum is summarized in Table 2.

TABLE 2

| Aluminum Density (mg/cm³) | Capacitance (F/g) | ESR of Capacitor (Ω-cm²) |
|---|---|---|
| 0 (unsprayed) | 115 | 52.0 |
| 157 | >130 | 1.509 |
| 209 | >140 | 1.299 |
| 250 | 147 | 1.26 |
| 410 | 144 | 1.08 |
| 509 | >130 | 1.308 |

The data in TABLE 2 was taken using aluminum impregnated carbon fiber cloth electrodes that were 2500 m²/g, cut to 5.1 cm in diameter and that contained approximately 0.2 g of carbon. The carbon density in the unsprayed cloth was 0.26 g/cm³.

As seen from the data in TABLE 2, the resistance of carbon fiber cloth that has been arc sprayed with aluminum is reduced by up to a factor of 50. Such a dramatic reduction in resistance, which is caused by a decrease in the volumetric resistivity of the aluminum impregnated carbon fiber cloth electrode structure, directly influences the electrode resistance, $R_{EL}$, and thus significantly improves the ability of the double layer capacitor to exhibit a low time constant.

As further seen from the data in TABLE 2, reducing the resistance of the aluminum impregnated carbon fiber cloth electrode through impregnation of aluminum is a process that must be optimized in order to produce the lowest electrode resistance for a desired amount of aluminum. Too little aluminum and the resistance remains too high. Too much aluminum, and the weight of the aluminum impregnated carbon fiber cloth electrode is increased sufficiently to degrade the energy density. Too much aluminum also blocks the electrolyte from penetrating into the weave of the carbon fiber cloth so as to contact all of the surface area of the activated carbon fibers, thereby effectively decreasing the available surface area.

It is significant that the arc spray 94 that is directed at the carbon fiber cloth 92 (FIG. 11) does much more than just coat the top or front surface of the carbon fiber cloth with a thin layer of aluminum. While the aluminum certainly does coat the top surface, it also penetrates deep into the carbon fiber cloth, or in between the interstices of the carbon fiber bundles within the carbon fiber cloth, and thus impregnates the carbon fiber cloth with aluminum. The significance of impregnating the carbon fiber cloth with aluminum is best illustrated with reference to FIGS. 4A through 5B.

Figure 4A:
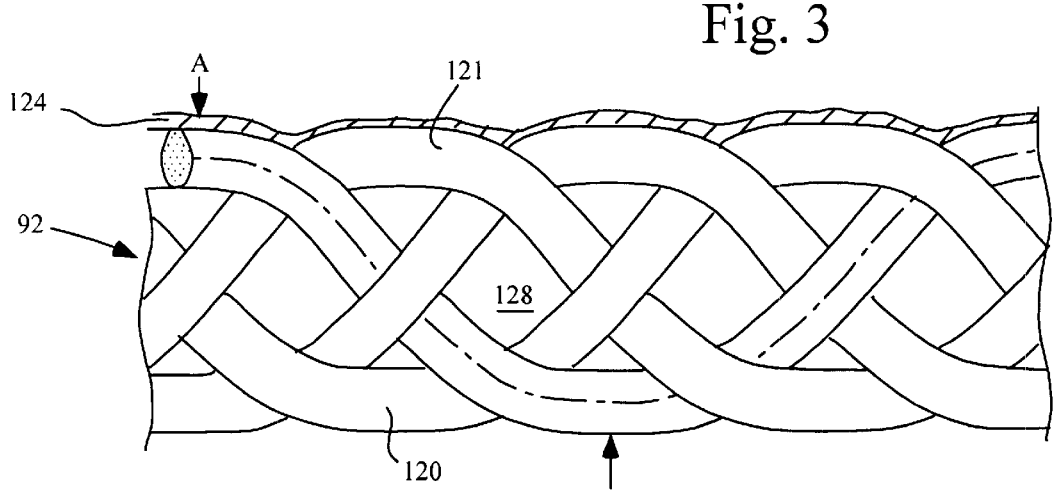
FIG. 4A is a cross-sectional illustration of a carbon fiber cloth, showing woven carbon fiber bundles and further illustrating a layer of aluminum impregnant.

Referring back to FIG. 4A, a schematic representation is shown of a side sectional view of the carbon fiber cloth 92. As seen in FIG. 4A, the carbon fiber cloth 92 is made up of a plurality of carbon fiber bundles 120 that are woven to form the carbon fiber cloth 92. For simplicity, only four such carbon fiber bundles 120 are shown in FIG. 4A. Each carbon fiber bundle 120 is made up of many activated carbon fibers 122, as seen best in FIG. 4B, which conceptually illustrates a cross-sectional view of an individual carbon fiber bundle 120.

Figure 4B:
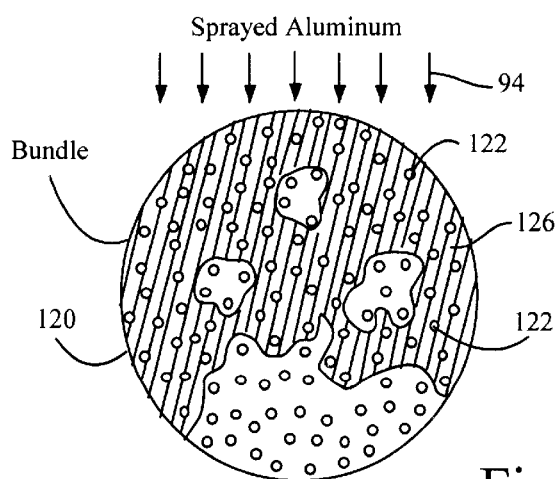
FIG. 4B is a cross-sectional illustration of a carbon fiber bundle, such as in FIG. 4A, made up of a multiplicity of activated carbon fibers, such as shown in FIG. 3, and further of an aluminum impregnant deep in the "tow" of the carbon fiber bundle.

The axial resistance of the individual activated carbon fibers 122 is very low, but the transverse resistance through a carbon fiber bundle 120 is relatively high. It is this transverse resistance, i.e., the resistance from point "A" on one side of the carbon fiber cloth 92 to point "B" on the other side of the carbon fiber cloth 92 that is lowered in order to reduce the electrode resistance $R_{EL}$. Arc spraying the carbon fiber cloth 92 with the aluminum arc spray 94 advantageously causes the aluminum to flow into the tow 126 of the carbon fiber bundle 120, as shown in FIG. 4B. Such penetration, or impregnation, into the tow of the carbon fiber bundle 120 reduces contact resistance between individual activated carbon fibers 122. The resulting low transverse contact resistance together with the intrinsic low axial resistance of the activated carbon fibers 122 result in a very low resistance path to be made completely through the width of the carbon fiber cloth 92, i.e., result in a very low transverse resistance through the aluminum impregnated carbon fiber cloth electrode.

Furthermore, the impregnation process used does not significantly effect the porosity of the carbon cloth 92. The porosity is maintained on a microscopic level such that sufficient electrolytic solution may be enter the pores of the carbon fiber bundles. Thus, even though the metal impregnant takes up some of the void volume of the carbon cloth, the metal impregnant is not small enough to interfere with the porosity of the carbon cloth 92; and, therefore the porosity of the carbon cloth 92 is maintained during the impregnation process. The resulting area/unit-volume of the carbon cloth 92 having been sprayed or the void volume of the carbon cloth 92 having been sprayed is about 600 $m^2/cm^3$. On the other hand, if too much metal is impregnated into the carbon fiber cloth, the metal may act as a barrier to the electrolytic solution being able to penetrate the carbon fiber cloth itself.

When the arc spray 94 strikes the carbon fiber cloth 92, it not only impregnates the tow 122 of the carbon fiber bundles 120 with aluminum, as described above, but it also forms a layer 124 of aluminum on the top surface of the carbon fiber cloth 92. The layer 124 is thin and contours to the shape of the surface of the carbon cloth. The use of the jet spray technique shown in FIGS. 10 and 11 provides a much thinner layer 124 of aluminum than a conventional wire arc spray technique. For example, the thickness of the layer 124 is typically not more than ¼ of the thickness of one carbon fiber bundle 120. In addition, some of the aluminum also fills some of the voids 128 between the carbon fiber bundles 120. The aluminum layer 124 helps to make good (low resistance) electrical contact with current collector foils 68, 72 (FIG. 2), but is not intended to function as a current collector itself. That is, the aluminum layer 124 serves to lower the contact resistance, $R_C$. The presence of aluminum in the voids 128 between the carbon fiber bundles 120 adds weight to the aluminum impregnated electrode and should thus be minimized after achieving adequate volumetric resistivity and a low characteristic RC time constant.

Figure 5A:
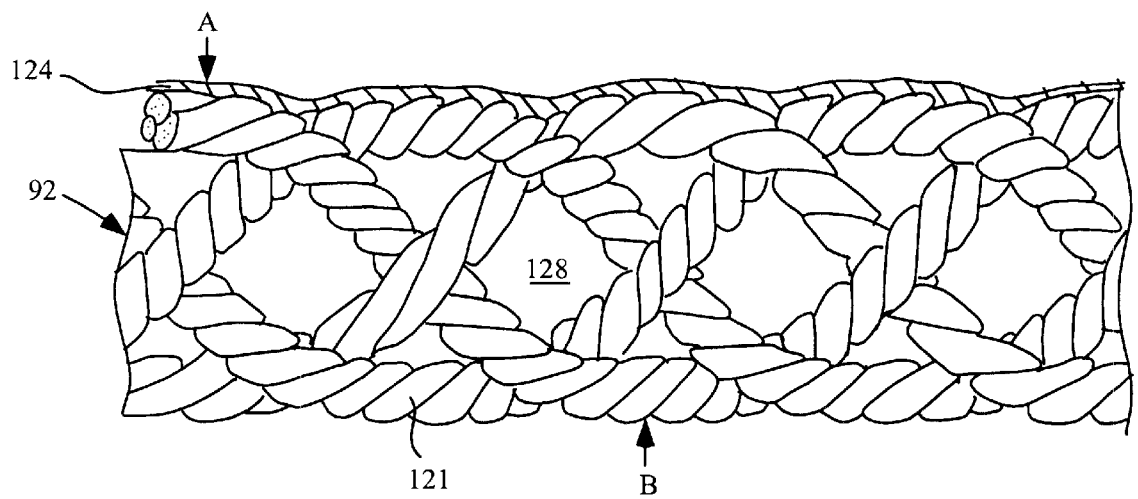
FIG. 5A shows a schematic representation of a side sectional view of the carbon cloth made out of twisted carbon fiber bundles, and illustrates how a plurality of twisted fiber bundles are woven to form the carbon cloth.

Referring to FIG. 5A, a representation of a side sectional view of another embodiment of the carbon cloth 92 made out of triple.,twisted carbon fiber bundles 121 is shown. A cross-section of one of the triple-twisted carbon fiber bundle is shown and further described in FIG. 5B. The carbon cloth 92 is entirely woven from the triple twisted carbon fiber bundles 121.

Figure 5B:
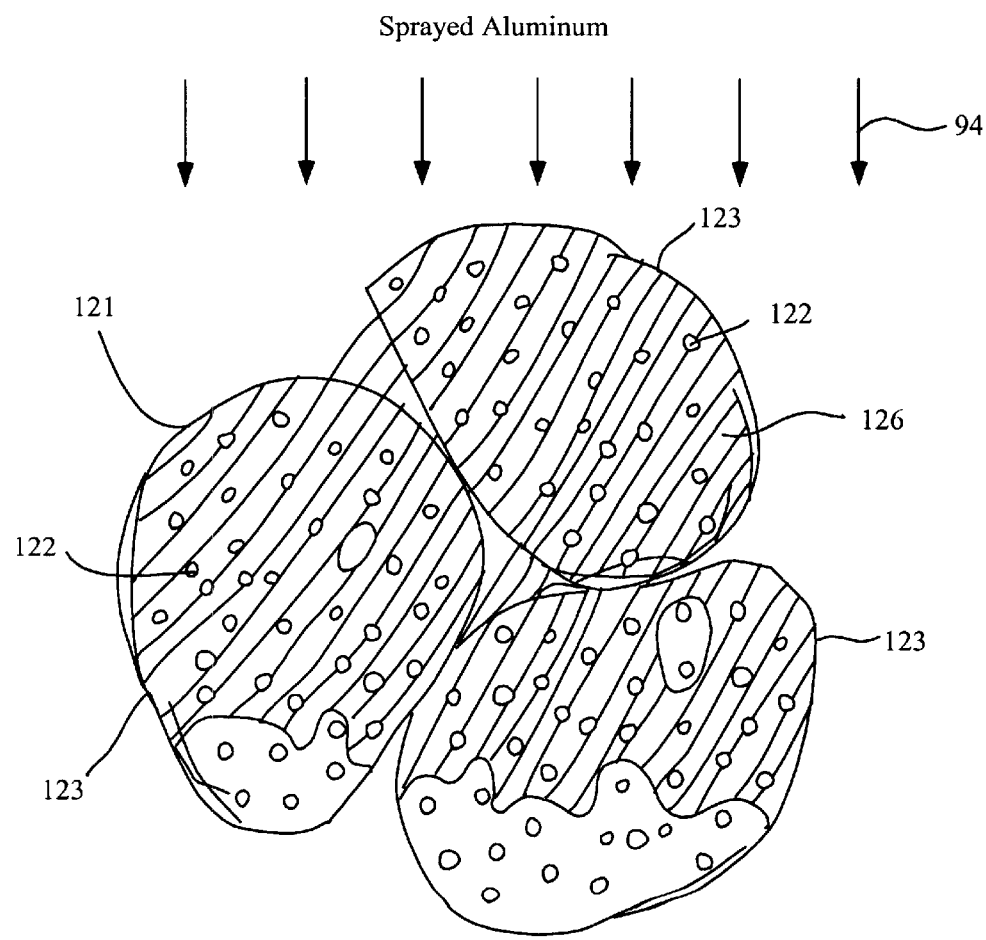
FIG. 5B conceptually illustrates a cross-sectional view of a triple twisted carbon fiber bundle of the carbon cloth, and further conceptually illustrates a preferred penetration of the aluminum deep into the tow of the fiber bundle.

Referring to FIG. 5B, conceptually shown is a cross sectional view of a triple twisted carbon fiber bundle 121 in the embodiment of the carbon cloth shown in FIG. 5A. Three carbon fiber bundles 123 have individual fibers and the tow of each carbon fiber bundle is shown, as well as the ideal impregnation depth of metal into the triple twisted carbon fiber bundle 121.

The three carbon fiber bundles 123 are twisted together to form a triple twisted carbon fiber bundle 121, which is about the same size as the carbon fiber bundle 120 of FIGS. 4A and 4B. The carbon cloth of FIG. 5A will be woven out of many triple twisted carbon fiber bundles 123. The twisting rotates the individual carbon fibers as they extend radially through the length of the fiber bundle 123; thus, less aluminum needs to be impregnated to reach all of the individual fibers of the triple twisted fiber bundle 123. This decreases the amount of carbon to carbon contacts within the fiber bundle 123 and; therefore, lowers the transverse resistance of the carbon cloth 92 using triple twisted fiber bundles even further than with the single fiber bundles 120 in FIG. 4A. The twisting force displaces the shape of the carbon fibers, especially at the edge of each carbon fiber bundle 123, where the carbon fiber bundles 123 begin to fray slightly; thus, allowing more aluminum 94 to be impregnated within the tow 126. Thus, the flow of current from the direction of Point "B" to Point "A" in FIG. 4A is improved with the triple twisted fiber bundle shown in FIG. 5A. By varying the twist and the tow size of the carbon fiber bundles 121, the transverse resistance can be lowered; thus, optimizing the transverse current flow in the carbon cloth 92.

The ideal impregnation depth of the aluminum into the tow 126 of the carbon fiber bundles 120 or the triple twisted carbon fiber bundles 121 has not yet been quantified. It is believed, however, that the impregnation pattern, when viewed in cross-section, is similar to that illustrated in FIGS. 4B and 5B, filling about ⅔ to ¾ of the available tow volume at the point where the bundle is exposed, at the surface of the cloth. This is approximately ¼ through the entire carbon cloth, having a similar cross section view as shown in FIGS. 4B and 5B for the individual carbon fiber bundles.

The weight of aluminum, using the jet spray technique, retained on or in the carbon cloth is maintained at between about 20–30%, e.g., 25%, of the total weight of the carbon cloth plus aluminum, or about 15% of the total weight, including the electrolyte. This is compared to about 50% of the total weight of the carbon cloth (either the carbon cloth of FIG. 4A or the triple twisted carbon cloth of FIG. 5A) plus aluminum in a conventional wire arc spray technique. The reduction is weight is largely attributed to the reduction in the layer 124 of aluminum deposited on the surface of the carbon cloth.

Manufacture of Hermetically Sealed Double Layer Capacitor

Returning again to the block diagram of FIG. 23, it is seen that after the carbon fiber cloth 92 has been sprayed and impregnated with aluminum (block 200), strips of carbon cloths are formed (block 202). The carbon fiber cloth 92 is cut into strips having appropriate dimensions to be used in the present embodiment of a double layer capacitor. The carbon cloth strips may be die cut as needed.

Referring to FIG. 12, shown is a header plate 132, a first terminal 134, a second terminal 136, a glass-to-metal seal 138 (also referred to as a hermetic seal) at the interface of the first terminal 134 with the header plate 132, an insulating barrier 140 and a first current collector foil 130.

Briefly referring back to FIG. 23, a preliminary step of forming the case and header plate 132 for the double layer capacitor is performed (block 220). The case (as shown in FIGS. 21A through 22) is a metal case comprising stainless steel, although may comprise other metals, such as titanium or aluminum. The header plate 132 is typically made of the same material as the case. Next the capacitor terminals are installed on the header plate 132 with a glass-to-metal seal 138 for pass through type terminals (Block 22 of FIG. 23) A first terminal 134 is installed in the header plate 132 such that a hermetic seal or glass-to-metal seal 138 is formed between the first terminal 134 and the header plate 132. The glass-to-metal seal 138 insulates the first terminal from the header plate and provides a seal such that the leakage of contaminants is substantially reduced from entering the double layer capacitor. The advantages of this feature are further discussed below. The first terminal 134 is a passthrough terminal which, as shown, passes through the header plate as shown. The second terminal 136 is also installed (welded) to the header plate 132. The header plate 132, complete with terminals 134 and 136, as well as the glass-to-metal seal 138, are commercially available from TeknaSeal, located in the state of Wisconsin. In this embodiment the hermetic seal insulates the first terminal from the header plate and the case.

The hermetic seal or glass-to-metal seal 138 is composed of silica (66%), Boron Oxide (17%), Alumina (8%), Potassium Oxide (1%), Sodium Oxide (7%), and Lithium Oxide (1%). Table 3 shows the physical properties associated with glass-to-metal seal 138. It is important that the thermal expansion and contraction match that of the header plate 132 such that the glass-to-metal seal 138 and the header plate 132 will expand and contract the same in order to effectuate the seal in a range of temperatures.

TABLE 3

| Physical Properties Property | | Units |
|---|---|---|
| Thermal Expansion | $56 \times 10^{-7}$ | |
| Thermal Contraction | $71 \times 1-10^{-7}$ | 521–25° C. |
| Strain pt | 479 | ° C. |
| Annealing pt | 521 | ° C. |
| Softening pt | 710 | ° C. |
| Density | 2.32 | gm/cm$^3$ |
| Dielectric Constant | 6.7 | 25° C., 1 MHz |
| Loss Factor | 4% | 25° C., 1 MHz |
| Volume Resistivity @ 150° C. | 11.76 | (log 10) ohm-cm |
| Volume Resistivity @ 250° C. | 7.1 | (log 10) ohm-cm |
| Volume Resistivity @ 350° C. | 5.7 | (log 10) ohm-cm |
| Voltage Breakdown | 2.1 | KV, 304 SST |

Furthermore, it is advantageous to have capacitor terminals that are solderable, such as to a printed circuit board or other similar device. In order to make the first terminal 134 and the second terminal 136 solderable, the first terminal 134 and the second terminal 136 are comprised of a platinum coated terminal or a platinum coated molybdenum wire. The platinum coating is used so that the terminals will be solderable, and the molybdenum is used since it has a similar coefficients of thermal expansion and contraction as does the glass-to-metal seal 138. Both platinum and molybdenum have similar coefficients of thermal expansion and contraction as the glass-to-metal seal 138. Thus, when the terminals are exposed to a thermal source the platinum coated molybdenum terminals will expand at the same rate as the glass-to-metal seal 138. If the coefficients of thermal expansion and contraction were not similar, then the terminals could expand faster than the glass-to-metal seal 138 and potentially crack the glass-to-metal seal 138 or reduce the effectiveness of the glass-to-metal seal 138 by allowing leakage of the electrolytic solution. In a very small design, such as the hermetically sealed capacitor shown in FIGS. 12 through 24, preventing this leakage is an important feature, and thus, the glass-to-metal seal 138 is used. Therefore, the particular selection of the platinumized molybdenum for the first terminal 134, since it is a pass through terminal is important to the life of the capacitor. The second terminal 136 should be platinum coated for solderability, but is not required to be a molybdenum wire since it does not pass through the metal plate 132.

The platinum coating may be applied to the molybdenum wire in a variety of ways as known in the art, such as dipping or diffusion bonding. The platinum coated molybdenum is passed through the header plate, and then a glass-to-metal seal 138 is formed between the platinum coated molybdenum and the header plate. The platinum coating is about 100 micro inches thick. Other materials may be used, instead of molybdenum, such as titanium; however, titanium is more resistive than molybdenum.

Again with reference to FIG. 23, in a parallel path to preparing the strips of carbon fiber cloth, the current collector foils are prepared. A first step in preparing the current collector foils is to precut aluminum foil to an approximate desired dimension (block 208), and then die cut the aluminum foil to the precise dimension (block 210). The preferred aluminum foil used for the current collector has a thickness of approximately 0.002 inches. For this embodiment two current collector foils are formed. The first current collector foil 130 (to have a positive polarity) is about 44 mm long and about 25 mm wide. The second current collector foil (to have a negative polarity) is about 62 mm by 25 mm.

One edge of the first current collector foil 130 (block 212 of FIG. 23) is bonded or welded to an interior portion of the first terminal 134, which passes through the header plate 132 at the glass-to-metal seal 138; thus, providing an electrical connection between an exposed (or exterior) portion of the first terminal 134 and the first current collector foil (130), which at the same time insulating the first current connector foil and the first terminal 134 from the header plate 132. An insulating barrier 140 can be interposed between the header plate 132 and a top edge of the current collector foil 130 so as to further assure insulation of the first current collector foil 130 from the header plate. The second terminal 136 is welded to the header plate 112 such that the second terminal 136 does not pass through the header plate 112. The second terminal 136 will electrically contact the header plate.

Referring to FIG. 13, a top view is shown of the header plate 132, the first terminal 134, the second terminal 136, a fill hole 142, the glass-to-metal seal 138, and the first current collector foil 130 having been welded to the interior portion of the first terminal 134.

Referring next to block 218 of FIG. 23, the electrode package is formed. FIGS. 14 through 20 illustrate this process.

Referring to FIG. 14, a first carbon fiber cloth 144 having been impregnated with aluminum is folded over the interior portion of the first terminal 134, with an aluminum side of the carbon fiber cloth 144 being placed against the first current collector foil 130, so as to create a low contact resistance electrical connection between the first carbon fiber cloth 144 and the first current collector foil 130, and, in turn, to create a low contact resistance electrical connection between the first carbon fiber cloth 144 and the first terminal 134. The first carbon fiber cloth 144 forms a first electrode 146 of the double layer capacitor.

Referring to FIG. 15, a top view is shown of the first electrode 146 including carbon cloth, the first carbon fiber cloth 144 having been impregnated with aluminum is shown folded over the interior portion of the first terminal 134 and the current collector foil 130, with the aluminum side of the first carbon fiber cloth 144 being placed into electrical contact with the current collector foil 130, so as to create a low contact resistance electrical connection between the first carbon fiber cloth 144, and the first current collector foil 130 and first terminal 134. Also shown is the header plate 132, and the fill hole 142.

Referring again to FIG. 23, it is seen that in addition to preparing the impregnated carbon fiber cloths (blocks 200–202), and preparing the aluminum current collector foils 130 (blocks 208–210), a porous separator 66 (FIG. 2) must also be formed (block 214) by precutting strips of separator material, such as polypropylene or polyethylene. A suitable polypropylene-based separator material is commercially available. A typical polypropylene-based material used is approximately 0.001 inches thick, and has an average pore size of about 0.04×0.12 μm.

However, when it is desired to use capacitor terminals that are solderable, i.e. the platinum coated molybdenum terminals earlier described, careful attention must be paid to the internal components selected since the capacitor case may be exposed to a thermal environment during the soldering process. For example, in an automated soldering process, it is estimated that the capacitor case may be exposed to up to 250 degrees Celsius for periods of up to 5 minutes within a soldering furnace. Thus, the internal components must be able to withstand the heat. The separator material is the most vulnerable, since it is prone to melting in the event of high heat. Such melting would result in a short circuit within the capacitor. During tests, the polypropylene-based separators normally used in the double layer capacitor design, in combination with an electrolytic solution comprised of tetraethylammonium tetraflouraborate (salt) in acetonitrile (solvent), failed (i.e. the separator melted) during the exposure to such heat. Even when exposed to the same heat for about 10 seconds, some of the test capacitors failed while the ones that did not developed significant parallel conductance.

Thus, in the solderable terminal embodiments, a porous TEFLON-based separator, i.e., a PTFE (polytetrafluoroethylene) based separator, which is available from W. L. Gore and Co., located in Elkton, Md., is used. In terms of capacitance and resistance, the TEFLON-based separator is essentially equivalent to the polypropylene-based and polyethylene-based separators earlier discussed. The TEFLON-based separator, in combination with electrolytic solutions of tetraethylammonium tetraflouraborate (salt) and acetonitrile (solvent), and tetraethyammonium tetraflouraborate (salt) and propylene carbonate (solvent), were able to withstand a heat source of 250 degrees Celsius for up to 5 minutes, consistent with a conventional soldering furnace, while the polypropylene-based and polyethylene-based separators both failed (i.e. melted). Table 4, shown below, illustrates the results in both resistance and capacitance before and after exposure to a heat source of 250 degrees Celsius for 5 minutes. The change in capacitance was negligible while only a slight increase in the resistance was observed between electrolytic solutions using propylene carbonate and acetonitrile as solvents. Thus, acetonitrile is the preferred solvent. Again, the polypropylene separator failed (melted) in the exposure.

TABLE 4

| Electrolyte | Capacitance (F) | | Resistance (ohms) | |
| --- | --- | --- | --- | --- |
|  | (Before) | (After) | (Before) | (After) |
| TEFLON (W/TEA TFB and ACN | 10.5 | 10.23 | 0.129 | 0.200 |
| TEFLON (W/TEA TFB and PC) | 10.02 | 9.94 | 0.376 | 0.394 |

Referring to FIG. 16, the porous separator 148 (either polypropylene-based or TEFLON-based as described above) is folder over the first carbon cloth electrode 146 (indicated by dashed lined), and sealed at its edges using any of a number of well known heat sealing or welding techniques. As such the porous separator envelopes the first carbon cloth, the first current collector foil, and the interior portion of the first terminal 134.

Referring to FIG. 17, a top view is shown of FIG. 16 such that the sealed edged of the porous separator 148 are particularly evident, as the porous separator envelopes the first carbon cloth 144, the first current collector foil 130, and the interior portion of the first terminal.

Referring to FIG. 18, a second carbon fiber cloth 150, this time with an aluminum side facing away from the first current collector foil 130 and away from the porous separator 148, is folded over the porous separator 148 along the interior portion of the first terminal 134. This second carbon fiber cloth 150 forms a second electrode of the double layer capacitor.

Next, still referring to FIG. 18, a second current collector foil 150 is shown folded over the second carbon cloth 150 along the interior portion of the first terminal 134. The second current collector foil 152 extends fully over one half of the aluminum side of the second carbon fiber cloth 150, and half way over another half of the aluminum side of the second carbon fiber cloth 150, so as to leave one half of one side of the aluminum side of the second carbon fiber cloth 150 exposed.

Referring to FIG. 19, a folded electrode assembly 151 is shown in which the exposed half of the one side of the second carbon fiber cloth 150 is folded over against the portion of the second current collector foil 152 extending over the half of the other side of the second carbon fiber cloth 150; thus, bringing the exposed half into contact with the second current collector foil 152, and creating a low contact resistance electrical connection between the second carbon fiber cloth 150 and the second current collector foil 152 along the entire aluminum side of the second carbon fiber cloth 150.

Referring to FIG. 20, a side view is shown of the header plate 132, the first terminal 134, the second terminal 136, the first current collector foil, the first carbon fiber cloth, the porous separator, the second carbon fiber cloth, and the second current collector foil having been assembled as described above. These items are referred to collectively as a capacitor sub-assembly 154.

Next, The first and second carbon fiber cloths, the porous separator, and the first and second current collector foils, are all then pressed together in a mechanical press so as to be subjected to a pressure of about 1600 psi (block 223 of FIG. 23). The carbon fiber cloth is somewhat spongy, so application of this pressure serves to compress somewhat the weave of the carbon fiber bundles so as to make the carbon fiber cloth thinner by about 15–20%. This reduction in the thickness of the carbon fiber cloth translates directly to a reduction in the thickness of the aluminum impregnated carbon fiber cloth electrodes, when assembled, and to a reduction in the electrode resistance $R_{EL}$ of the aluminum impregnated carbon fiber cloth electrodes. Further, and more importantly, application of the pressure smooths the top side of the carbon fiber cloth 92 (smooths out the valleys and peaks) so that more surface area of the sprayed aluminum layers 124 (FIG. 4) on the first carbon cloth 144 and the second carbon cloth 150 are able to contact the first current collector 130 and the second current collector foil 152, respectively, so as to reduce the contact resistance $R_C$ of the double layer capacitor.

The capacitor sub-assembly 154 is next carefully inserted into a case or can 156 (block 224 of FIG. 23), so as to bring the second current collector foil, which is exposed at an exterior of the capacitor sub-assembly 154 into electrical contact with an interior of the case 156 and to bring an edge of the case 156 into contact with an edge of the header plate 132. The header plate 132 is next secured into place by welding, thus making the case sealable (block 224) and bringing the header plate 132 into electrical contact with the case, and second current collector foil 152. The second terminal 136 having been welded to the header plate 132, and is brought into electrical contact with the case, and the second current collector foil 152, such as the second terminal 136 is in electrical contact with the second electrode and the first terminal 134 is in electrical contact with the first electrode.

Referring to FIGS. 21A through 22, the capacitor sub-assembly 154 having been inserted into the case 156 is shown, with the edge of the header plate 132 having been welded to the edge of the case 156. Also shown is a ball bearing 161 that is welded to the fill hole 142. The ball bearing 161 is not welded in place until block 248 of FIG. 24. This combination of structures is referred to herein as the capacitor assembly 160.

Referring to FIGS. 21B and 22, crimps 162 are shown that are forced into the side of the capacitor assembly 160. The crimps 162 are formed (block 226) by indenting one side of the capacitor assembly 160 with a crimping tool. The crimps 162 are shown on the opposite side of the capacitor assembly 160 as shown in FIG. 21A. The purpose of the crimps 162 is to apply a modest, constant pressure to the first and second electrodes having been folded. The crimps 162 bring the first carbon cloth 144, the second carbon cloth 150, porous separator 148, first current collector foil 130, second current collector foil 152, and case into close physical contact, providing for good electrical contact (low resistance). The crimping helps reduce resistance between the components as well as slightly compress the impregnated carbon cloth to effectively reduce the internal resistance of the cloth. The modest constant pressure, in part, enables the double layer capacitor to achieve high capacitances. The crimps 162 further serve the function of adding structural integrity to the capacitor assembly.

Another feature of the hermitically sealed capacitor or capacitor assembly 160 is the first terminal 134 and the second terminal 136 are such that they may be mounted or soldered directly to a printed circuit board. The size of the capacitor assembly 160 and terminals are minimized. The first terminal is insulated by the glass-to-metal seal from the case 156 and the second terminal is conductive with the case. Alternatively, both terminals could be pass through terminals and insulated from the case 156. However, this creates another location (at the second terminal) where contaminants may leak in. Due to the small size of the assembly 160, it is preferable to have only one terminal hermetically sealed with a glass-to-metal seal and the other simply welded to the header plate.

Referring again to FIG. 23, once the case has been closed and crimped (block 226), it is tested for electrical shorts (block 228). This test is performed simply by measuring the resistance between the electrical terminals of the capacitor. In an ideal double layer capacitor, this resistance (for a "dry" assembly—no electrolyte yet introduced into the closed case) should be infinite. A low resistance measurement, e.g., of just a few ohms, between the terminals of the closed dry assembly, indicates that an electrical short has occurred internal to the assembly. In practice, a dry resistance of at least 20 MΩ is acceptable to pass this test for electrical shorts.

Referring back to FIG. 21A and also to FIG. 24, at this point the contents of the capacitor assembly are dried by evacuating the case over an extended period of time, e.g. 48 hours. The case is evacuated and the internal components are thoroughly dried (block 230). Such drying process typically takes place over a 2 or 3 day period, and comprises attaching a vacuum pump to the closed assembly, via the fill hole, and maintaining a constant negative pressure of about $10^{-6}$ Torr for a specified period of time, e.g., 48 to 72 hours. Once dried, the assembly is tested for leaks (block 232). Such leak testing may be done using any suitable technique as is known in the art. A preferred leak test includes spraying an inert gas, e.g., helium (He), over and around the closed case while it is still connected to the vacuum pump, and while a negative pressure is still maintained within it. If there is a leak, the negative pressure inside the case sucks the He gas through the leak, and the He gas can then be detected in the outstream flow of the vacuum pump.

If the leakage test is successfully passed, then the case is ready to be impregnated, through the fill hole, with a prescribed amount of a specified electrolyte solution (block 246). The electrolyte solution is introduced into the capacitor assembly by using a vacuum infiltration process in a controlled environment, so as to minimize contamination.

The electrolyte solution is mixed by dissolving a selected salt in a prescribed solvent. Hence, to prepare the solution, the solvent is prepared (block 234) and the specified salt (block 236) is procured. As previously indicated, the preferred solvent is an organic solvent acetonitrile ($CH_3CN$). The preferred salt is tetraethylammonium tetraflouraborate, or $(CH_3CH_2)_4N^+BF_4^-$. Note that for the embodiments that solderable, the preferred salt is still tetraethylammonium tetraflouraborate and the preferred solvent is still acetonitrile. Furthermore, another preferred salt is triethylmethylammonium tetraflouraborate, or $(CH_3CH_2)_3 CH_3N^+BF_4^-$, which is slightly more soluble than tetraethylammonium tetraflouraborate. The electrolytic solution is mixed (block 238) by first drying the salt for at least 12 hours, and then dissolving the dried salt in the solvent. The ratio of salt to solvent is 303.8 g/liter, which yields 1.4 moles/liter.

Once mixed, the electrolyte solution is tested for impurities (block 240). It is important that the amount of water in the electrolyte be reduced to less than 20 ppm (parts per million), preferably less than about 15 ppm. If the level of impurities, e.g., water, in the electrolyte exceeds 20 ppm, the operating life of the double layer capacitor is adversely affected. It is important for impurities, particularly water, to be removed from the electrolyte before the electrolyte is impregnated into the case of the double layer capacitor. (It is noted that some additives may be added to the electrolyte, e.g., to enhance its performance or improve the operating life of the capacitor; but water should be avoided in the present embodiment.)

The water content of the solution is measured using a coulometric titrator, as is known in the art. A representative titrator that may be used for this purpose is the LC3000 Titrator available from EM Science Aquastar.

Unfortunately, some water may already be inside of the closed case assembly, despite attempts to thoroughly dry the inside of the assembly. For example, water may be trapped in the activated carbon fibers of the carbon fiber bundles of the carbon fiber cloth. Such trapped water may be released into the electrolyte, thereby becoming an impurity within the electrolyte, as soon as the impurity-free electrolyte is impregnated into the case. To remove such water (or similar impurities) from the carbon, it is contemplated that the closed assembly be flushed with a suitable solvent, e.g., acetonitrile, the electrolytic solution, or other water-scavenger material, prior to filling the case with the electrolyte. It is also contemplated that the carbon fiber cloth, prior to being impregnated with aluminum, and/or after being impregnated with aluminum, but before being assembled in to the aluminum impregnated carbon cloth electrodes, may also be flushed or cleansed with a suitable material selected to remove impurities, especially water (e.g., water scavengers or additives that search out and remove water).

If the electrolyte solution successfully passes the impurity test (block 240), it is also tested for conductivity (block 242). The conductivity test is performed using a conventional conductance meter that measures conductance using an ac signal. The conductance of the solution should be at least 55–58 mmho/cm at 22° C.

Once the electrolyte solution has been mixed and tested for impurities and conductivity, it is impregnated into the case (block 246; FIG. 24).

After the prescribed amount of electrolyte solution has been impregnated into the case, a ball bearing is welded into place over the fill hole in the header plate, so as to seal the fill hole (block 248) of the capacitor assembly, and contain the electrolyte solution.

Then, final electrical tests of the double layer capacitor are performed (block 250) to test whether the double layer capacitor meets its specified performance criteria.

Generally, final acceptance tests include charging the double layer capacitor to its specified working voltage, $V_W$, for six hours and then allowing the double layer capacitor to self-discharge over a fourteen hour period. The voltage drop that occurs during this 14 hour self-discharge period provides a measure of the equivalent parallel resistance of the double layer capacitor, which should be at least 40,000 ohms.

Additional acceptance tests that are performed include subjecting the double layer capacitor to a constant current cycle test to determine the cycling capacitance and steady state series resistance. This test is performed by applying a biphasic 300 milliamp and/or 1 amp current to the double layer capacitor. The voltage waveform resulting from application of the current is measured. From the current and voltage waveforms, which includes time measurements, a large number of parameters are determined to characterize the capacitor. Such parameters include the charge capacitance, $C_{up}$; the discharge capacitance, $C_{down}$; the half discharge capacitance, $C_{1/2}$, and the steady state resistance, $R_\infty$. In order to meet presently-imposed desired performance criteria, these values should be $C_{down}$>10 Farad; $R_\infty$<125 milliohms, $C_{up}/C_{down}$>0.98; and $C_{down}/C_{up}$<1.05.

The final acceptance tests also include ac impedance tests. The key parameter to measure is the initial resistance, $R_0$. This resistance affects the peak power the double layer capacitor can deliver. It is measured at 1000 Hz using a Solatron 1250 Frequency Response Analyzer and a PARC 273 Poteniostat. $R_0$ should be about one-half of the value of $R_\infty$, or about 65 mΩ.

As described above, it is thus seen that the present embodiment represents a significant advance in the double-layer capacitor art. The use of carbon fiber cloth impregnated with aluminum, folded around a current collector foil plate, forms an efficient electrode structure that provides very low electrode resistance. As described and shown, a double layer capacitor is realized that exhibits capacitance values in excess of 10 Farads at a nominal working voltage of about 2.3 volts, an electrode resistance of about 1.25 mΩ, a time constant of about 1.2 seconds, an energy density in the range of 2.9–3.5 W-hr/kg, and a power rating of over 1000 W/kg. Advantageously, these operating parameters can improve even more when the double layer capacitor is operated at a higher voltage, e.g., 2.7 volts, or even 3.0 volts (which can be readily be done once all the impurities are removed from the electrolyte solution) and the weight of the case is reduced. For example, at an operating voltage of 3.0 volts, the energy density rises to 5.0 W-hr/kg. Further, by using a polyethylene separator material, instead of a polypropylene separator, the effective electrode resistance may be reduced even further, allowing the time constant of the double layer capacitor to be reduced to around 1.0 seconds.

Glass-to-metal Seal (Hermetic Seal)

Referring to FIGS. 25 and 26 and Table 5, the advantages of the hermetic seal as employed in the double layer capacitor are discussed. The life of an electrochemical capacitor employing a non-aqueous electrolytic solution can be extended if a hermetic seal is used in the capacitor. The hermetic seal limits the influx of oxygen and water into the cell. The hermetic seal is very important in small sized capacitors since the ratio of electrolyte volume to capacitor seal area is very small; thus, an influx of moisture has a more profound effect than a larger capacitor having much more electrolyte volume to capacitor seal area. Table 5 (below) shows the water vapor transmission rates through different types of polymers and glass. It can be seen that the transmission rates are orders of magnitude higher in polymer materials than in glass. It can also be seen that the transmission rates increase by at least an order of magnitude as the temperature is increased from 75° to 110° F. The effect of the increased transmission rates on the water contamination level is shown in FIG. 25. The capacitor design as in FIGS. 12 through 24 (i.e. PC 10) was used as a comparison with a similar sized capacitor without hermetic seals (non-hermetically sealed capacitor). The capacitor packages used measured 25 mm×44.5 mm. For the purposes of this test, the internal components of the capacitor were removed. The package was filled with approximately 1.5 ml of electrolytic solution with a contamination level of 30 ppm water. The cells were heated to 60° C. and periodically removed to check for water contamination. These test results are shown in FIG. 25. Similar tests with hermetically sealed packages show that this increase in water contamination can be virtually eliminated with the improved seal.

The increase in life achieved with a capacitor employing an organic electrolyte with a hermetic seal is demonstrated by comparing the life characteristic of two capacitor designs the UC20 and the PC 10. The PC 10 is an 8 farad capacitor that employs a glass-to-metal hermetic seal. The details of this design of the capacitor and seal are shown with reference to FIGS. 12–24. The design of the non-hermetic UC20 is constructed of two pieces of aluminum foil that have been sealed with a surlyn thermoplastic. The capacitor has an active area of approximately 20 cm². See FIG. 26, which plots the change in capacitance and resistance as a function of time for the two capacitor designs.

TABLE 5

Water Vapor Transmission Rates

| Sealing Material | 73% Relative Humidity @ 73° F. (g/m²/day) | 80% Relative Humidity @ 110° F. (g/m²/day) |
| --- | --- | --- |
| Silicon | 0.35 | 8.2 |
| Fluorosilicon | 0.24 | 6.5 |
| Nitrile | 0.10 | 3.8 |
| Ethylene Propylene | 0.01 | 0.41 |
| Butyl | <0.005 | 0.14 |
| Surlyn ionomer/metal composite film | | 0.14 (100° F., 90% Rel. Humidity) |
| Glass | <0.00005 | <0.00009 |

Referring to FIG. 25, a graph is shown illustrating moisture content on an ordinate axis versus time on an abscissa axis for a non-heretically sealed double layer capacitor (e.g. UC20). The capacitor illustrated in FIG. 25 was packaged with a surlyn ionomer/metal composite seal. As can be seen, the moisture content of the non-hermetically sealed double layer capacitor rose from 30 ppm to over 190 ppm in just 200 hours of operation, in comparison the moisture content of the hermetically sealed double layer capacitor (i.e. PC 10) that negligibly changed in over 700 hours. As can be seen, the use of the hermetic seal significantly reduces the influx of moisture into the capacitor case; thus, moisture content can be successfully controlled for a significant period of time using early designs in accordance with the embodiment described herein. It is anticipated, however, that further development in the drying process, electrolyte preparation, the glass-to-metal seal, and the welding of the header plate to the case, and the ball bearing to the header plate will result in substantially increased levels of hermeticity, and thus enhanced longevity in the double layer capacitor.

Referring to FIG. 26, a set of graphs is shown of percentage change on an ordinate axis versus time on an abscissa axis for capacitance and for internal resistance of a non-hermetically sealed double layer capacitor, and for capacitance and for internal resistance of a hermetically sealed double layer capacitor (i.e. PC 10). In FIG. 26 it is observed that internal resistance remains low, and capacitance remains high for an extended period of time after the manufacture of the double layer capacitor having a hermetic seal as described herein, as compared to a non-hermetically sealed double layer capacitor.

While the invention described above has been described by means of specific embodiments and applications thereof, numerous modifications and variations could be made thereto by those of skill in the art without departing from the scope of the invention set forth in the claims.

What is claimed is:

1. A long life double layer capacitor comprising:
   a case;
   a first terminal;
   an electrically insulating hermetic seal interposed between the first terminal and the case;
   a first current collector foil electrically coupled to an interior portion of the first terminal;
   a first metal impregnated carbon cloth electrode having a metal impregnated side, the metal impregnated side of the first metal impregnated carbon cloth electrode being juxtaposed against the first current collector foil;
   a porous separator juxtaposed against the first metal impregnated carbon cloth electrode;
   a second metal impregnated carbon cloth electrode having a metal impregnated side, an opposing side of the second metal impregnated carbon cloth electrode being opposite the metal impregnated side of the second metal impregnated carbon cloth electrode, the opposing side of the second metal impregnated carbon cloth electrode being juxtaposed against the porous separator, wherein the porous separator is interposed between the first metal impregnated carbon cloth electrode, and the second metal impregnated carbon cloth electrode;
   a second current collector foil, the second current collector foil being juxtaposed against the metal impregnated side of the second metal impregnated carbon cloth electrode;
   a second terminal electrically coupled to the second current collector foil; and
   an electrolyte solution saturating the first metal impregnated carbon cloth electrode, and the second metal impregnated carbon cloth electrode, wherein the electrolyte solution is substantially contained by the case and the electrically insulating hermetic seal, and wherein influx of impurities into the electrolyte solution is substantially inhibited by the case and the electrically insulating hermetic seal.

2. The long life double layer capacitor of claim 1 wherein said electrically insulating hermetic seal comprises glass.

3. The long life double layer capacitor of claim 2 wherein said first terminal comprises molybdenum.

4. The long life double layer capacitor of claim 2 wherein said first terminal comprises platinum coated molybdenum.

5. The long life double layer capacitor of claim 2 wherein said case comprises:
   a header plate, wherein the electrically insulating hermetic seal is interposed between the first terminal and the header plate; and
   a can, wherein the header plate is welded to the can.

6. The long life double layer capacitor of claim 2 wherein said electrically insulating hermetic seal comprises one or more of the group consisting of silica, boron oxide, alumina, potassium oxide, sodium oxide, and lithium oxide.

7. The long life double layer capacitor of claim 1 wherein said case comprises a conductive case.

8. The long life double layer capacitor of claim 7 wherein said conductive case comprises stainless steel.

9. The long life double layer capacitor of claim 1 wherein said first metal impregnated electrode comprises:
   a first carbon cloth electrode;
   a metal impregnated within a tow of the carbon fiber cloth.

10. The long life double layer capacitor of claim 9 wherein said metal is selected from a group consisting of aluminum, copper, and titanium.

11. The long life double layer capacitor of claim 1 wherein said porous separator can withstand exposure to temperatures of up to 250° C. for periods of up to 5 minutes.

12. The long life double layer capacitor of claim 11 wherein said porous separator material comprises polytetrafluoroethylene (PTFE).

13. The long life double layer capacitor of claim 1 wherein said case can withstand exposure to temperatures of up to 250° C. for periods of up to 5 minutes.

14. The long life double layer capacitor of claim 1 wherein said electrolyte solution comprises a selected solvent and a selected salt.

15. The long life double layer capacitor of claim 14 wherein said selected solvent comprises acetonitrile or propylene carbonate.

16. The long life double layer capacitor of claim 14 wherein said selected salt comprises tetraethylammonium tetraflouraborate or triethylmethylammonium tetraflouraborate.

17. The long life double layer capacitor of claim 1 wherein said electrically insulating hermetic seal can withstand exposure to temperatures of up to 250° C. for periods of up to 5 minutes.

18. The long life double layer capacitor of claim 1 further comprising one or more crimps formed in said case for exerting a modest, constant pressure on an electrode assembly contained within said case.

19. A long life double layer capacitor comprising:
    a hermetically sealed case;
    a plurality of metal impregnated electrodes, each having a metal impregnated side;
    a plurality of current collector foils each juxtaposed against a respective one of the plurality of metal impregnated electrodes against said metal impregnated side;
    a porous separator material positioned between respective ones of the plurality of metal impregnated electrodes; and
    a non-aqueous electrolyte solution saturating said plurality of metal impregnated electrodes, wherein a multi-electrode, single cell device is formed, and wherein influx of impurities into the non-aqueous electrolyte solution is substantially inhibited by the hermetically sealed case.

20. The long life double layer capacitor of claim 19 wherein said hermetically sealed case comprises a glass-to-metal seal.

21. The long life double layer capacitor of claim 20 wherein said glass-to-metal seal can withstand exposure to temperatures of up to 250° C. for periods of up to 5 minutes.

22. The long life double layer capacitor of claim 20 wherein a first terminal is coupled to at least one of said plurality of metal impregnated electrodes through said glass-to-metal seal.

23. The long life double layer capacitor of claim 22 wherein said first terminal comprises molybdenum.

24. The long life double layer capacitor of claim 23 further comprising:
    a second terminal wherein said second terminal is electrically coupled to said case.

25. The long life double layer capacitor of claim 23 wherein said first terminal further comprises platinum.

26. The long life double layer capacitor of claim 23 wherein said first terminal comprises a platinum coated molybdenum wire.

27. The long life double layer capacitor of claim 19 wherein said first metal impregnated electrode comprises:
    a first carbon fiber cloth;
    metal impregnated into the tow of the first carbon fiber cloth.

28. The long life double layer capacitor of claim 27 wherein said second metal impregnated electrode comprises:
    a second carbon fiber cloth;
    additional metal impregnated into the tow of the second carbon fiber cloth.

29. The long life double layer capacitor of claim 28 wherein said metal and said additional metal are selected from the group consisting of aluminum, copper, and titanium.

30. The long life double layer capacitor of claim 19 wherein said electrolyte solution comprises a selected solvent and a selected salt.

31. The long life double layer capacitor of claim 30 wherein said selected solvent comprises acetonitrile or propylene carbonate.

32. The long life double layer capacitor of claim 31 wherein said selected salt comprises tetraethylammonium tetraflouraborate or triethylmethylammonium tetraflouraborate.

33. The long life double layer capacitor of claim 19 wherein said hermetically sealed case can withstand exposure to temperatures of up to 250° C. for periods of up to 5 minutes.

34. The long life double layer capacitor of claim 19 wherein said porous separator material can withstand exposure to temperatures of up to 250° C. for periods of up to 5 minutes.

35. The long life double layer capacitor of claim 34 wherein said porous separator material comprises polytetrafluoroethylene (PTFE).

36. The long life double layer capacitor of claim 19 wherein said double layer capacitor can withstand exposure to temperatures of up to 250° C. for periods of up to 5 minutes.

37. The long life double layer capacitor of claim 19 further comprising one or more crimps formed in said hermetically sealed case for exerting a modest, constant pressure on said plurality of metal impregnated electrodes, said plurality of current collector foils, and said porous separator material contained within said hermetically sealed case.

38. A method of making a long life double layer capacitor comprising:
    impregnating a plurality of electrodes with a metal;
    juxtaposing a respective impregnated side of each of the plurality of electrode with one of a plurality of current collector foils;
    interposing a porous separator between respective other sides of each of the plurality of electrodes;
    saturating the plurality of electrodes with an electrolyte solution;
    sealing hermetically the plurality of electrodes and the plurality of current collector foils within a case to substantially inhibit an influx of impurities into the electrolyte solution.

39. The method of claim 38 wherein said sealing comprises:
    interposing a glass-to-metal seal between an opening in said case and a first terminal; and
    electrically coupling the first terminal to one of said plurality of current collector foils.

40. The method of claim 39 wherein said glass-to-metal seal can withstand exposure to temperatures of up to 250° C. for periods of up to 5 minutes.

41. The method of claim 38 wherein said impregnating comprises impregnating a carbon fiber cloth with said metal.

42. The method of claim 41 wherein said impregnating comprises arc spraying the carbon fiber cloth with said metal.

43. The method of claim 42 wherein said impregnating comprises impregnating tow of the carbon fiber cloth with said metal.

44. The method of claim 43 wherein said metal is selected from the group consisting of aluminum, copper, and titanium.

45. The method of claim 43 wherein said impregnating further comprises arc spraying said metal into the carbon fiber cloth with a jet arc spray nozzle.

46. The method of claim 38 wherein said interposing comprises interposing said porous separator wherein said porous separator can withstand exposure to temperatures of up to 250° C. for periods of up to 5 minutes.

47. The method of claim 46 wherein said porous separator comprises polytetrafluoroethylene (PTFE).

48. A method of making a double player capacitor comprising:

coupling a first current collector foil to an internal portion of a first terminal;

folding a first metal impregnated electrode over the current collector foil;

placing a porous separator against the first metal impregnated electrode; juxtaposing a second metal impregnated electrode against the porous separator;

coupling electrically the second metal impregnated electrode to a case;

saturating the first metal impregnated electrode and the second metal impregnated electrode with an electrolyte solution; and sealing hermetically the case, wherein the electrolyte is substantially contained within the case, and wherein influx of impurities into the electrolyte solution is substantially impaired.

49. The method of claim 48 wherein said placing said porous separator comprises enveloping said first metal impregnated electrode with said porous separator.

50. The method of claim 49 wherein said juxtaposing comprises juxtaposing said second metal impregnated electrode over said porous separator.

51. The method of claim 50 wherein said coupling electrically comprises:

juxtaposing a second current collector foil over the second metal impregnated electrode; and contacting the second current collector foil with the case.

52. The method of claim 48 further comprising:

impregnating said first metal impregnated electrode and said second metal impregnated electrode with a metal.

53. The method of claim 52 wherein said impregnating further comprises impregnating a first carbon fiber cloth and a second carbon fiber cloth with said metal, wherein said metal penetrates into a tow of the first carbon fiber cloth and the second carbon fiber cloth.

54. The method of claim 52 wherein said metal is selected from the group consisting of aluminum, titanium, and copper.

55. The method of claim 48 wherein said sealing hermetically includes:

forming a glass-to-metal seal between another portion of said first terminal and said case.

56. The method of claim 55 wherein said sealing hermetically further includes:

welding a header to a can, wherein the header includes the glass-to-metal seal.

57. The method of claim 55 further comprising:

selecting a material for said first terminal having a coefficient of thermal expansion substantially similar to a coefficient of thermal expansion of glass.

58. The method of claim 57 wherein said selecting comprises selecting molybdenum.

59. The method of claim 57 wherein said selecting comprises selecting platinum plated molybdenum.

60. The method of claim 57 wherein said selecting comprises selecting a plating material for said first terminal that is solderable.

61. The method of claim 48 further comprising selecting a material for said porous separator that can withstand exposure to temperatures of up to 250° C. for periods of up to 5 minutes.

62. The method of claim 61 wherein selecting said material for said porous separator comprises selecting said material comprising polytetrafluoroethylene (PTFE).

63. The method of claim 48 further comprising selecting materials to make said double layer capacitor that can withstand exposure to temperatures of up to 250° C. for periods of up to 5 minutes.

64. The method of claim 48 further comprising placing a modest constant pressure on said first and second metal impregnated electrodes, said first and second current collector foils, and said porous separator.

65. The method of claim 64 wherein said placing said modest constant pressure comprises forming crimps in said case.

* * * * *

UNITED STATES PATENT AND TRADEMARK OFFICE
CERTIFICATE OF CORRECTION

PATENT NO. : 6,449,139 B1 Page 1 of 1
DATED : September 10, 2002
INVENTOR(S) : Farahmandi et al.

It is certified that error appears in the above-identified patent and that said Letters Patent is hereby corrected as shown below:

Column 35,
Line 16, change "player" to -- layer --.
Line 23, after "electrode;" begin a new paragraph.

Signed and Sealed this

Eighteenth Day of February, 2003

JAMES E. ROGAN
*Director of the United States Patent and Trademark Office*